US009278888B1

United States Patent
Al-Mutlaq

(10) Patent No.: US 9,278,888 B1
(45) Date of Patent: Mar. 8, 2016

(54) USE OF NON-CHLORIDE CEMENT ACCELERATOR AND ELECTRIC ARC FURNACE DUST IN CEMENT

(71) Applicant: Saudi Basic Industries Corporation, Riyadh (SA)

(72) Inventor: Fahad M. Al-Mutlaq, Jubail Industrial (SA)

(73) Assignee: SAUDI BASIC INDUSTRIES CORPORATION, Riyadh (SA)

( * ) Notice: Subject to any disclaimer, the term of this patent is extended or adjusted under 35 U.S.C. 154(b) by 0 days.

(21) Appl. No.: 14/065,959

(22) Filed: Oct. 29, 2013

Related U.S. Application Data

(60) Provisional application No. 61/721,064, filed on Nov. 1, 2012.

(51) Int. Cl.
  C04B 18/06 (2006.01)
  C04B 18/14 (2006.01)

(52) U.S. Cl.
  CPC .................................. C04B 18/149 (2013.01)

(58) Field of Classification Search
  CPC ........................................................ C04B 18/06
  USPC ........................................ 106/707; 264/333
  See application file for complete search history.

(56) References Cited

U.S. PATENT DOCUMENTS

| | | | | |
|---|---|---|---|---|
| 3,427,175 A * | 2/1969 | Angstadt et al. | ............... | 106/713 |
| 3,801,338 A * | 4/1974 | Whitaker | ....................... | 106/728 |
| 4,033,782 A * | 7/1977 | Ray et al. | ....................... | 106/696 |
| 4,092,109 A * | 5/1978 | Rosenberg et al. | ............... | 422/7 |
| 4,116,706 A * | 9/1978 | Previte | ......................... | 106/727 |
| 4,285,733 A * | 8/1981 | Rosenberg et al. | ............ | 106/640 |
| 4,451,295 A | 5/1984 | Sprouse | | |
| 4,502,887 A * | 3/1985 | Tsuda | ............................... | 524/8 |
| 4,769,077 A * | 9/1988 | Crocker | ........................ | 106/728 |
| 4,917,723 A | 4/1990 | Coyne, Jr. | | |
| 5,245,122 A | 9/1993 | Smith | | |
| 5,278,111 A | 1/1994 | Frame | | |
| 5,527,388 A * | 6/1996 | Berke et al. | .................... | 106/819 |
| 5,557,031 A * | 9/1996 | Al-Sugair et al. | ............. | 106/697 |
| 5,622,558 A | 4/1997 | Berke et al. | | |

(Continued)

FOREIGN PATENT DOCUMENTS

| | | |
|---|---|---|
| DE | 3716484 A1 | 11/1988 |
| DE | 3942827 C1 | 4/1991 |
| WO | WO-2014/068409 A2 | 5/2014 |

OTHER PUBLICATIONS

Portland Cement Association. "Portland Cement Association Sustainable Manufacturing Fact Sheet, Iron and Steel Byproducts," Fact Sheet, Jul. 2005, pp. 1-4.

(Continued)

Primary Examiner — Paul Marcantoni
(74) Attorney, Agent, or Firm — Ballard Spahr LLP

(57) ABSTRACT

The present disclosure relates to cement compositions comprising: (a) cement, (b) an electric arc furnace dust (EAFD), and (c) a non-chloride cement accelerator; wherein the electric arc furnace dust is present in an amount from greater than 0 wt % to 8 wt % based on the total weight of the cement (a). Also disclosed are methods for making the disclosed compositions and products using the disclosed compositions. This abstract is intended as a scanning tool for purposes of searching in the particular art and is not intended to be limiting of the present invention.

22 Claims, 12 Drawing Sheets

(56) References Cited

U.S. PATENT DOCUMENTS

| | | | |
|---|---|---|---|
| 5,853,474 A | 12/1998 | Hilton | |
| 7,644,548 B2 * | 1/2010 | Guevara et al. | 52/223.1 |
| 7,972,432 B2 | 7/2011 | Guynn et al. | |
| 8,152,917 B2 | 4/2012 | Al-Negheimish et al. | |
| 8,366,825 B2 * | 2/2013 | Sabio et al. | 106/724 |
| 2003/0023128 A1 | 1/2003 | Smith | |
| 2010/0037803 A1 | 2/2010 | Al-Negheimish et al. | |
| 2011/0048285 A1 | 3/2011 | Barbour | |
| 2012/0049399 A1 * | 3/2012 | Al-Zaid et al. | 264/122 |

OTHER PUBLICATIONS

Al-Mutlaq, F. M., "Aspects of the Use of Electric Arc Furnace Dust in Concrete," Thesis submitted to The University of Birmingham, UK, electronically published Dec. 1, 2011, pp. 1-301.

Al-Mutlaq, F. M., "Effects of electric arc furnace dust on susceptibility of steel to corrosion in chloride-contaminated concrete," in *Proceedings of International Symposium on Cement & Concrete Materials (ISCCM 2011)*, Birmingham University, Birmingham, UK, pp. 60-64, presented at International Symposium on Cement & Concrete Materials (ISCCM 2011), Ningbo, China, Nov. 7-9, 2011 (Abstract).

PCT/IB2013/003093, filing date Oct. 29, 2013, F. M. Al-Mutlaq (Saudi Basic Industries Corp.).

International Search Report and Written Opinion issued on Jul. 22, 2014 for Intl. App. No. PCT/IB2013/003093, filing date Oct. 29, 2013 (Applicant—Saudi Basic Industries Corp. // pp. 1-13).

Machado J.G.M.S. et al.: "Chemical, physical, structural and morphological characterization of the electric arc furnace dust", Journal of Hazardous Materials, Elsevier, Amsterdam, NL, vol. 136, No. 3, Aug. 25, 2006, pp. 953-960.

\* cited by examiner

US 9,278,888 B1

USE OF NON-CHLORIDE CEMENT ACCELERATOR AND ELECTRIC ARC FURNACE DUST IN CEMENT

CROSS REFERENCE TO RELATED APPLICATIONS

This Application claims the benefit of priority to U.S. Provisional Application No. 61/721,064, filed on Nov. 1, 2012, which is incorporated herein by reference in its entirety.

FIELD OF INVENTION

The present invention relates to cement compositions. The present invention also relates to methods of manufacturing these compositions and products that include these compositions.

BACKGROUND OF THE INVENTION

Electric arc furnace dust (EAFD) is a by-product of the electric steelmaking industry and is produced in large quantities around the world. Recently, the worldwide production rate of EAFD has increased annually as the steel industry grows internationally. The estimated quantity of EAFD produced annually, worldwide, is about 3.7 million tons, of which European sources account for some 500,000-900,000 tons. In the United States, the approximate quantity of the EAFD produced every year is about 700,000-800,000 tons, and this rate of EAFD production is estimated to increase by 4-6% each year. The safe disposal of these by-products is expensive and continues to be a serious concern in many countries throughout the world. For example, the disposal cost in the United States alone has been estimated at upwards of approximately $200 million per year.

Moreover, there continues to be a lack of suitable disposal sites due to the potential negative environmental impact from EAFD. According to most authorities, including the European Waste Catalogue, EAFD is classified as a hazardous material (code 10 02 07), and thus, disposal at landfill sites before treatment is prohibited due to the potential leachability of heavy metals, such as Zn and Pb. Thus, there remains a strong need in the art for methods of safely disposing of EAFD.

SUMMARY OF THE INVENTION

As described in more detail herein, the present invention, in one aspect, relates to a cement composition comprising: (a) cement, (b) an electric arc furnace dust (EAFD), and (c) a non-chloride cement accelerator; wherein the electric arc furnace dust is present in an amount from greater than 0 wt % to 8 wt % based on the total weight of the cement (a).

In a further aspect, the invention relates to a method for manufacturing cement that contains electric arc furnace dust, the method comprising: mixing cement ingredients comprising: (i) cement; (ii) an electric arc furnace dust (EAFD); and (iii) a non-chloride cement accelerator; to thereby form a cement mixture; wherein the electric arc furnace dust is present in an amount from greater than 0 wt % to 8 wt % based on the total weight of the cement (i).

In a further aspect, disclosed is a cementitious product comprising the disclosed compositions. In a still further aspect, disclosed is a product made by the disclosed methods.

In one aspect, the disclosed cement compositions comprising EAFD are capable of exhibiting improved early compressive strength and/or workability. Thus, in a further aspect, the disclosed cement compositions have application to uses and products that utilize cement, for example, products and uses requiring early compressive strength. In a still further aspect, the disclosed methods and compositions comprising EAFD also provide for a means of safely disposing of EAFD.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE FIGURES

The accompanying figures, which are incorporated in and constitute a part of this specification, illustrate several aspects and together with the description serve to explain the principles of the invention.

DETAILED DESCRIPTION OF THE INVENTION

Figure 1:
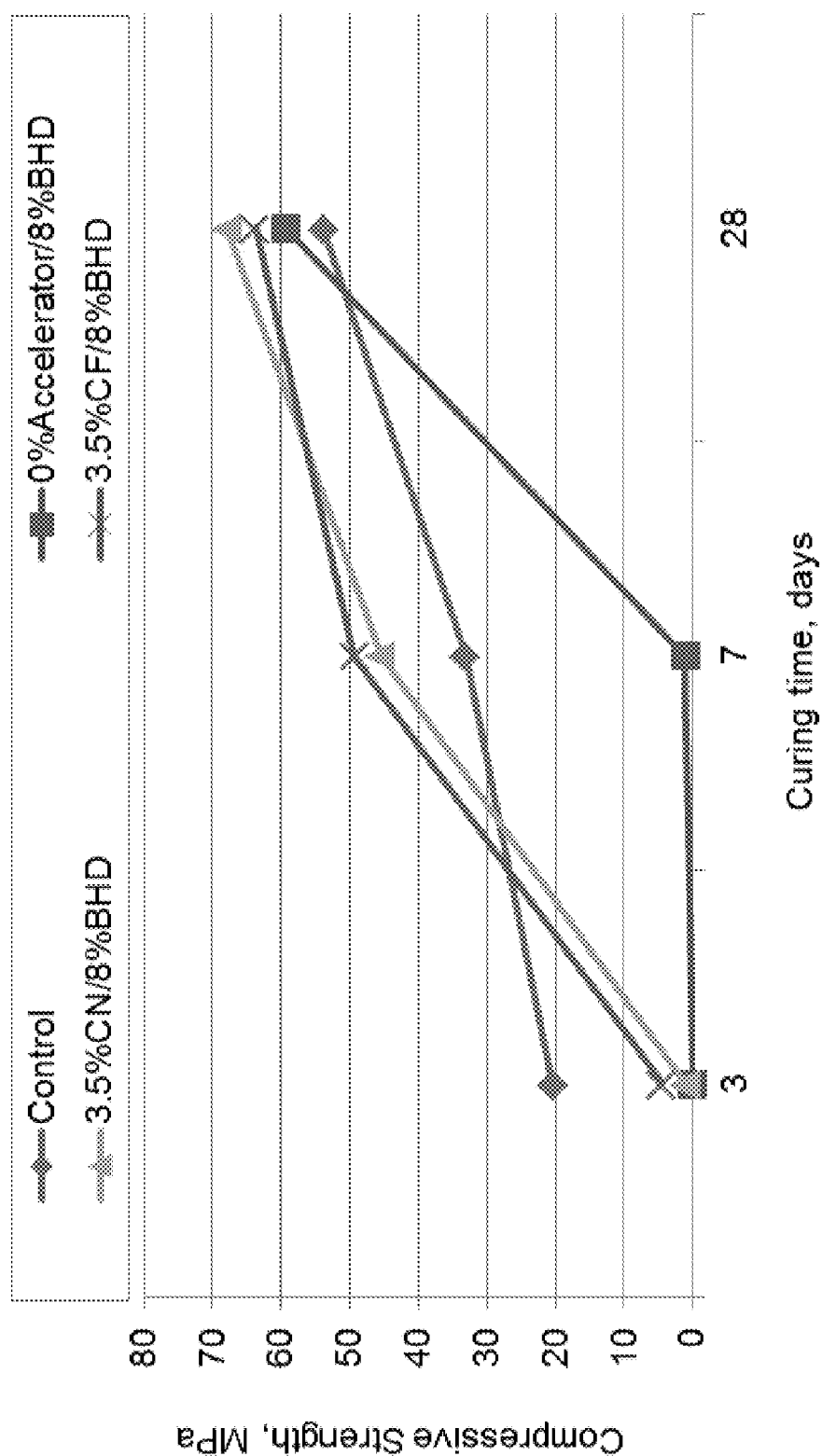
FIG. 1 shows representative compressive strength data for two representative disclosed cement compositions of the present invention compared to representative comparative samples.

The present invention can be understood more readily by reference to the following detailed description, examples, drawings, and claims, and their previous and following description. However, before the present compounds, compositions, articles, devices, systems, and/or methods are disclosed and described, it is to be understood that this invention is not limited to the specific compounds, compositions, articles, devices, systems, and/or methods disclosed unless otherwise specified, as such can, of course, vary. It is also to be understood that the terminology used herein is for the purpose of describing particular aspects only and is not intended to be limiting.

The following description of the invention is also provided as an enabling teaching of the invention in its best, currently known embodiment. To this end, those of ordinary skill in the relevant art will recognize and appreciate that changes and modifications can be made to the various aspects of the invention described herein, while still obtaining the beneficial results of the present invention. It will also be apparent that some of the desired benefits of the present invention can be obtained by selecting some of the features of the present invention without utilizing other features. Accordingly, those of ordinary skill in the relevant art will recognize that many modifications and adaptations to the present invention are possible and can even be desirable in certain circumstances and are thus also a part of the present invention. Thus, the following description is provided as illustrative of the principles of the present invention and not in limitation thereof.

Various combinations of elements of this disclosure are encompassed by this invention, e.g. combinations of elements from dependent claims that depend upon the same independent claim.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. Although any methods and materials similar or equivalent to those described herein can be used in the practice or testing of the present invention, example methods and materials are now described.

All publications mentioned herein are incorporated herein by reference to disclose and describe the methods and/or materials in connection with which the publications are cited.

DEFINITIONS

As used in the specification and in the claims, the term "comprising" may include the embodiments "consisting of" and "consisting essentially of." Unless defined otherwise, all technical and scientific terms used herein have the same meaning as commonly understood by one of ordinary skill in the art to which this invention belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "a non-chloride cement accelerator" includes mixtures of two or more non-chloride cement accelerators.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

It is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific aspect or combination of aspects of the methods of the invention.

References in the specification and concluding claims to parts by weight, of a particular element or component in a composition or article, denote the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included. For example if a particular element or component in a composition or article is said to have 8% weight, it is understood that this percentage is relation to a total compositional percentage of 100%.

As used herein, the terms "optional" or "optionally" means that the subsequently described event or circumstance can or cannot occur, and that the description includes instances where said event or circumstance occurs and instances where it does not.

As used herein, the term or phrase "effective," "effective amount," or "conditions effective to" refers to such amount or condition that is capable of performing the function or property for which an effective amount is expressed. As will be pointed out below, the exact amount or particular condition required will vary from one embodiment to another, depending on recognized variables such as the materials employed and the processing conditions observed. Thus, it is not always possible to specify an exact "effective amount" or "condition effective to." However, it should be understood that an appropriate effective amount will be readily determined by one of ordinary skill in the art using only routine experimentation.

As used herein, the term or phrase "cement" refers to a composition or substance with one or more constituents that is capable of forming cement or binding materials together, once set. Generally, cement can include a number of dry constituents chosen based on the desired ratio or class of cement to be produced. Thus, cement refers to the dry, pre-set composition unless the context clearly dictates otherwise.

As used herein, the term or phrase "electric arc furnace dust" or "EAFD" is a term of art and refers to a solid by-product or material produced from a furnace steelmaking process, and is intended to encompass by-products and materials generated from all steelmaking operation phases and sources, such as, for example, scrap iron furnaces or sponge iron furnaces.

As used herein, the term or phrase "bag house dust" or "BHD" is a term of art and refers to a type of electric arc furnace dust generated in Saudi Arabia, which may, in various aspects, have similar or differing chemical compositions than electric arc furnace dusts produced from different countries.

As used herein, the term or phrase "cement accelerator," "concrete accelerator," "cement accelerating admixture," or "concrete accelerating admixture" refers to a chemical capable of accelerating the hardening (early strength development) of cement or concrete. For example, a "non-chloride cement accelerator" would refer to a chloride-free chemical capable of accelerating early strength development of cement or concrete.

Composition

As described above, the present invention provides a cement composition comprising (a) cement, (b) electric arc furnace dust (EAFD), and (c) a non-chloride cement accelerator; wherein the electric arc furnace dust is present in an amount from greater than 0 wt % to 8 wt % based on the total weight of the cement (a).

In various aspects, the disclosed compositions comprise cement. Typically, any cement can be used. In a further aspect, the cement comprises hydraulic or non-hydraulic cement, or a combination thereof. In a still further aspect, the cement comprises Portland cement, for example, Ordinary Portland Cement (OPC) Type I, Type II, Type III, Type IV, or Type V, or a combination thereof. In a yet further aspect, the cement comprises a cement blend of two or more types of cement, for example, a blend comprising Portland cement and non-Portland hydraulic cement. In an even further aspect, the cement comprises masonry cement, for example, a mortar or the like. In a still further aspect, the cement is in the dry form. If needed to set, water is typically added after the cement is mixed with the other components, for example, the EAFD and non-chloride cement accelerator, and it is then ready to be hardened or set. In a further aspect, the water and one or more components are mixed with the cement simultaneously.

In various aspects, the disclosed compositions further optionally comprise one or more additional components. In one aspect, the cement compositions further comprise an aggregate component. In a further aspect, the aggregate component comprises sand, gravel, limestone, granite, marble, or stone, or a combination thereof. In a still further aspect, the aggregate component comprises fine aggregate or course aggregate, or a combination thereof. In this aspect, the aggregate can have various particle sizes and distributions. In a yet further aspect, the aggregate has a size of less than about 50 mm, for example, less than about 40, 35, 30, 25, 20, 15, 10, 5, 4, 3, 2, or 1 mm. In an even further aspect, the aggregate cement is siliceous, for example, quartzite sand or siliceous rounded river gravel. Thus, in one aspect, the aggregate in combination with the cement produces concrete. Typically, the concrete can comprise any concrete.

In various aspects, the disclosed compositions comprise by-products produced from a steelmaking process. In one aspect, the disclosed compositions comprise by-products produced from an electric steelmaking process. In a further aspect, the by-products comprise electric arc furnace dust (EAFD). In a still further aspect, the electric arc furnace dust (EAFD) comprises EAFD produced in various regions, for example, EAFD from North America or Europe or the Middle East. In a yet further aspect, the EAFD comprises EAFD of varying compositions depending on the type of scrap used, type of additives used during the production stage and the type of steel manufacture. For example, in one aspect, the EAFD comprises EAFD generated in Saudi Arabia, also referred to as bag house dust (BHD). In a further aspect, the EAFD comprises unstabilized, untreated EAFD. In a still further aspect, the EAFD comprises stabilized, untreated EAFD. In a yet further aspect, the EAFD comprises treated EAFD. In an even further aspect, the disclosed compositions comprise at least one additional by-product, for example, fly ash, blast furnace slag, or silica fume, or the like. The chemical composition of an exemplary, non-limiting BHD analyzed by X-ray fluorescence spectrometry (XRF) used in accordance with the present invention is provided below in Table 1.

TABLE 1

| Element | Average weight (%) |
|---|---|
| Aluminum (Al) | 0.17 |
| Calcium (Ca) | 5.79 |
| Iron (Fe) | 29.44 |
| Magnesium (Mg) | 2.5 |
| Manganese (Mn) | 1.52 |
| Lead (Pb) | 1.8 |
| Silicon (Si) | 1.31 |
| Zinc (Zn) | 18.78 |
| Potassium (K) | 3.24 |
| Sodium (Na) | 0.88 |
| Chloride (Cl) | 2.25 |
| Sulfur (S) | 0.46 |
| Phosphorus (P) | 0.13 |
| Copper (Cu) | 0.13 |

In another aspect, the electric arc furnace dust is present in an amount from greater than 0 wt % to 8 wt % based on the total weight of the cement (a). The amount of EAFD is not based on the total composition weight; it is based on the weight of the cement (a) only. For example, if 100 kg of cement (a) are present, for 8 wt % EAFD, 8 kg of EAFD are present regardless of the other components. Further, the dry weight cement basis is used, that is, the wt % does not include any water added to set the cement. In a still further aspect, the electric arc furnace dust is present in an amount from at least about 0.1 wt %, for example, at least about 0.5, 1, 2, 3, 4, 5, 6, or 7 wt % based on the total weight of the cement (a), to 8 wt %, based on the total weight of the cement (a). In a yet further aspect, the electric arc furnace dust is present in an amount from about 0.1 wt % to 8 wt %, for example, from about 1 wt % to 8 wt %, from about 2 wt % to 8 wt %, from about 3 wt % to 8 wt %, or from about 4 wt % to 8 wt %, based on the total weight of the cement (a).

As previously described, the disclosed compositions comprise a non-chloride cement accelerator. In one aspect, the non-chloride cement accelerator comprises calcium nitrite or calcium formate, or a combination thereof. In a yet further aspect the non-chloride cement accelerator is present in an amount from greater than 0.1 wt % based on the total weight of the cement (a). The amount of non-chloride cement accelerator is not based on the total composition weight; it is based on the weight of the cement (a) only. For example, if 100 kg of cement (a) are present, for 3.5 wt % non-chloride cement accelerator, 3.5 kg of non-chloride cement accelerator are present regardless of the other components. Further, the dry weight cement basis is used, that is, the wt % does not include any water added to set the cement. In a still further aspect, the non-chloride cement accelerator is present in an amount of at least about 0.5 wt %, for example, at least about 1.0, 1.5, 2.0, 2.5, 3.0, 3.5, 4.0, 4.5, 5.0, 5.5, or 6.0 wt %, based on the total weight of the cement (a). In a yet further aspect, the non-chloride cement accelerator is present in an amount from greater than 0 wt % to about 5 wt %, for example, from greater than about 0 wt % to about 5 wt %, from greater than about 0 wt % to about 4 wt %, or from 0.5 wt % to about 3.5 wt %, based on the total weight of the cement (a).

In various aspects, the disclosed compositions optionally comprise at least one additional chemical component. In a further aspect, the chemical component comprises an accelerator, a retarder, a plasticizer, a superplasticizer, a pigment, a corrosion inhibitor, a bonding agent, or a pumping agent, or a combination thereof. In a still further aspect, the disclosed compositions comprise a reinforcing component, such as, for example, steel reinforcement bars, steel mesh, steel fibers, glass fibers, carbon fibers, or plastic fibers, or the like.

As disclosed herein, the present invention provides, in various aspects, cement compositions comprising EAFD which exhibit improved workability and/or early compressive strength. As shown in the examples below, in one aspect, the disclosed compositions do not exhibit the severe retardation of compressive strength seen in EAFD-only containing cement compositions without a non-chloride cement accelerator. In a further aspect, the disclosed compositions exhibit a compressive strength of at least 1 MPa after 3 days of curing, for example, at least about 5, 10, 20, 30, or 40 MPa after 3 days of curing. In a yet further aspect, the disclosed compositions exhibit a compressive strength of at least 1 MPa after 7 days of curing, for example, at least about 5, 10, 20, 30, 40, 50, 60, 70, or 80 MPa after 7 days of curing. In a still further aspect, the disclosed compositions exhibit improved compressive strength after 28 days of curing. In a yet further aspect, the disclosed compositions exhibit a compressive strength of at least about 40 MPa after 28 days of curing, for example, at least about 50, 60, 70, or 80 MPa after 28 days of curing.

In a further aspect, the disclosed compositions exhibit improved workability or slump when mixing with water. In a still further aspect, the disclosed compositions exhibit a slump value of at least 1 mm as defined by BS EN 206-1, for example, at least about 5, 10, 15, 20, 25, 30, 35, 40, 45, 50 mm, or even at least about 55, 60, 65, 70, 75, 80, 85, 90, 95, 100 mm, or even at least about 105, 110, 115, 120, 125, or 130 mm, as defined by BS EN 206-1.

In a further aspect, the disclosed compositions comprise a cementitious product. In a still further aspect, the disclosed compositions comprise a hydraulically set product formed from the disclosed composition. In a yet further aspect, the disclosed compositions comprise concrete.

Articles and Products

In various aspects, the disclosed compositions are useful in the manufacture of various end use articles or products. In one aspect, various cementitious products are formed from a hydraulically set product comprising the disclosed compositions. In a further aspect, the disclosed compositions are formed into useful shaped articles or products by a variety of means such as, for example, using molds, casts, or forms, or the like. Any typical process of forming cement or concrete can be used herein.

As described herein, the disclosed compositions, in various aspects, advantageously exhibit early compressive strength development. Thus, in one aspect, the disclosed compositions are useful in cast-in-place or poured-in-place applications, where sufficient early compressive strength can be critical. In a further aspect, the disclosed compositions are useful in precast applications such as, for example, forming precast structural products.

In one aspect, the invention relates to molded articles, the articles comprising the cast or set product formed from a composition comprising: (1) cement; (2) an electric arc furnace dust (EAFD); and (3) a non-chloride cement accelerator; wherein the electric arc furnace dust is present in an amount from greater than 0 wt % to 8 wt % based on the total weight of the cement (1). In a still further aspect, the composition used to form the articles further comprises an aggregate component. In a yet further aspect, the composition further comprises one or more chemical components as described herein.

In another aspect, the invention relates to molded articles, the articles comprising the hydraulically set product formed from a composition comprising: (1) cement; (2) an electric arc furnace dust (EAFD); and (3) a non-chloride cement accelerator; wherein the electric arc furnace dust is present in an amount from greater than 0 wt % to 8 wt % based on the total weight of the cement (1). In a still further aspect, the composition used to form the articles further comprises an aggregate component. In a yet further aspect, the composition further comprises one or more chemical components as described herein.

In a further aspect, the articles or products comprise different types of structures and components of structures produced using the disclosed compositions. Typically, any cement or concrete structure is applicable herein. In a still further aspect, non-limiting examples of articles or uses include, for example, building and construction applications, slabs, foundations, walls, bricks, blocks, walls beams, columns, foundations, frames, architectural structures, pipes, pavements, bridges, overpasses, motorways, roads, runways, parking structures, dams, pools, reservoirs, pipes, footings, gates, fences, poles, and like applications.

Manufacture of Compositions and Products

In various aspects, the compositions and products according to the present invention are manufactured by various methods. In one aspect, the disclosed compositions are blended by a variety of methods involving intimate admixing of the materials. In a further aspect, the methods further comprise incorporating any additional additives desired in the composition. In another aspect, the disclosed compositions are formed into articles or products by a variety of means such as, for example, using molds, casts, or forms, or the like.

Thus, in one aspect, disclosed are methods for manufacturing cement that contains electric arc furnace dust, the methods comprising mixing cement ingredients comprising: (1) cement, (2) an electric arc furnace dust (EAFD), and (3) a non-chloride cement accelerator; to thereby form a cement mixture; wherein the electric arc furnace dust is present in an amount from greater than 0 wt % to 8 wt % based on the total weight of the cement (1). In a further aspect, the methods comprise one or more additional steps comprising adding water, adding an aggregate component, or adding one or more chemical components as described herein. In an even further aspect, the methods further comprise setting the cement mixture or casting the cement mixture to produce cast cement.

In another aspect, the invention provides methods of forming an article or product, the method comprising the steps of: (a) preparing a cement composition by combining: (1) cement; (2) an electric arc furnace dust (EAFD); (3) a non-chloride cement accelerator; wherein the electric arc furnace dust is present in an amount from greater than 0 wt % to 8 wt % based on the total weight of the cement (1); and (b) forming an article or product from the prepared cement composition. In a further aspect, the composition used to form the articles or products further comprises an aggregate component. In a yet further aspect, the composition further comprises one or more chemical components as described herein.

In various aspects, the disclosed methods for manufacturing the disclosed compositions and products can be performed in any order. In one aspect, the EAFD is introduced by mixing the desired proportion of EAFD with dry cement powder. In a further aspect, the EAFD and cement mixture is dry mixed, for example, to ensure adequate dispersion of EAFD particles in the resulting mixture. In another aspect, aggregate is added to the dry mixture and mixed. In another aspect, the non-chloride accelerator, when present, is dissolved in mixing water, and then added to the dry mixture. In another aspect, the non-chloride accelerator, when present, is added to the dry mixture before adding mixing water. In another aspect, mixing water is added to the dry mixture and all constituents are mixed together, for example, to form a uniform consistency.

In a further aspect, the resulting mixture is cast in a mold to produce a cast composition or product. In various aspects, the casting process comprises any typical cement or concrete casting process. In another aspect, the casting process is carried out in multiple steps. In a further aspect, the casting process comprises a vibration step. In a still further aspect, the vibration step comprises vibrating the filled mold, for example, to remove air and/or minimize segregation. In another aspect, the top surface of the filled mold is removed. In a further aspect, fresh mixture is added to fill the mold. In another aspect, the vibration and filling steps are repeated as necessary to produce the desired composition or product.

In various aspects, the disclosed methods and compositions comprising EAFD provide numerous environmental advantages. In one aspect, use of EAFD in cement according to the present invention provides an effective means of EAFD disposal. In a further aspect, the disclosed methods and compositions, by utilizing EAFD, reduce potential environment problems associated with EAFD disposal. In a yet further aspect, the disclosed methods and compositions eliminate the need to dispose EAFD as land fill. In a still further aspect, the reduction in EAFD disposal frees landfill space.

In another aspect, use of EAFD as a partial replacement of cement raw materials in accordance with the methods and compositions of the present invention reduces the high $CO_2$ emission generated during manufacture of cement.

In various aspects, the disclosed compositions exhibit significantly improved properties. In one aspect, the disclosed compositions exhibit significantly improved workability and/or compressive strength properties. In a further aspect, the disclosed compositions can effectively overcome EAFD-induced retardation, caused by the presence of EAFD, in up to 8 wt % of cement.

In another aspect, the compositions disclosed herein provide robust early compressive strength, for example, early compressive strength values of at least 5 MPa after 7 days of curing. In a further aspect, the disclosed compositions exhibit robust early compressive strength while still achieving higher compressive strength values at 28 days than a substantially identical reference composition without EAFD or non-chloride accelerator.

In another aspect, the disclosed compositions and products exhibit reduced bleeding. Bleeding is also referred to as water gain, and is a particular form of segregation, in which a portion of the water from the cement or concrete mixture comes out to the surface. In some cases, a quantity of cement can also come to the surface along with this water, and in such cases, the top surface can have diminished wearing quality. Thus, in a further aspect, the disclosed compositions and products exhibit improved wear and durability. In a still further aspect, the disclosed compositions and products having improved durability exhibit improved resistance to the ingress of aggressive agents from the environment, such as, for example, $Cl^-$, $SO_4^{2-}$ or $CO_2$, or the like.

In one aspect, the disclosed compositions and products also exhibit enhanced chloride binding capacity. In another aspect, the disclosed compositions and products exhibit reduced risk of corrosion. In yet another aspect, the disclosed compositions and products exhibit reduced corrosion rates.

In various aspects, the disclosed compositions and products also provide economical advantages. In one aspect, the disclosed compositions and products are useful in thin part applications such as, roof slabs or road slabs, and in high temperature or sunny environments that can accelerate excessive bleeding. As described above, articles and products formed from the disclosed compositions exhibit improved wearing quality. As such, articles and products formed from the disclosed compositions require less frequent replacement or repair. In a further aspect, the improved surface quality of articles and products formed from the disclosed compositions generate less surface dust in hot environments and less mud in rainy environments.

In another aspect, the disclosed methods and compositions utilize untreated EAFD, thereby avoiding the cost associated with pretreatment of EAFD. In another aspect, the disclosed compositions are useful in high temperature environments that can negatively impact cement or concrete properties. In such cases, demanding and costly interventions, such as, adding ice or additional chemicals, are required to prevent or counteract adverse effects on the cement or concrete properties. In a further aspect, the disclosed compositions and products can be used in high temperature environments without the need for ice or chemicals to counteract high temperature effects.

The present invention includes at least the following embodiments.

Embodiment 1

A cement composition comprising (a) cement; (b) an electric arc furnace dust (EAFD); and (c) a non-chloride cement accelerator; wherein the electric arc furnace dust is present in an amount from greater than 0 wt % to 8 wt % based on the total weight of cement (a).

Embodiment 2

The composition of embodiment 1, further comprising an aggregate component.

Embodiment 3

The composition of embodiment 2, wherein the aggregate component comprises sand, gravel, limestone, granite, marble, or stone, or a combination thereof.

Embodiment 4

The composition according to any preceding embodiment, wherein the cement comprises Ordinary Portland Cement (OPC) Type I, Type II, Type III, Type IV, or Type V, or a combination thereof.

Embodiment 5

The composition according to any preceding embodiment, wherein the electric arc furnace dust is bag house dust (BHD).

Embodiment 6

The composition according to any preceding embodiment, wherein the electric arc furnace dust is present in an amount of at least 0.1 wt % based on the total weight of cement (a).

Embodiment 7

The composition according to any preceding embodiment, wherein the electric arc furnace dust is present in an amount of at least 1 wt % based on the total weight of cement (a).

Embodiment 8

The composition according to any preceding embodiment, wherein the electric arc furnace dust is present in an amount of at least 2 wt % based on the total weight of cement (a).

Embodiment 9

The composition according to any preceding embodiment, wherein the electric arc furnace dust is present in an amount of at least 3 wt % based on the total weight of cement (a).

Embodiment 10

The composition according to any preceding embodiment, wherein the electric arc furnace dust is present in an amount of at least 4 wt % based on the total weight of cement (a).

Embodiment 11

The composition according to any preceding embodiment, wherein the electric arc furnace dust is present in an amount of at least 5 wt % based on the total weight of cement (a).

Embodiment 12

The composition according to any preceding embodiment, wherein the cement accelerator comprises calcium nitrite, or calcium formate, or a combination thereof.

Embodiment 13

The composition according to any preceding embodiment, wherein the cement accelerator is present in an amount greater than 0.5 wt % based on the total weight of cement (a).

Embodiment 14

The composition according to any preceding embodiment, wherein the cement accelerator is present in an amount of at least 1 wt % based on the total weight of cement (a).

Embodiment 15

The composition according to any preceding embodiment, wherein the cement accelerator is present in an amount of at least 2 wt % based on the total weight of cement (a).

Embodiment 16

The composition according to any preceding embodiment, wherein the cement accelerator is present in an amount of at least 2.5 wt % based on the total weight of cement (a).

Embodiment 17

The composition according to any preceding embodiment, wherein the cement accelerator is present in an amount of at least 3 wt % based on the total weight of cement (a).

Embodiment 18

The composition according to any preceding embodiment, wherein the cement accelerator is present in an amount greater than 0 wt % to 4 wt % based on the total weight of cement (a).

Embodiment 19

The composition according to any preceding embodiment, further comprising at least one additional chemical component comprising an accelerator, a retarder, a plasticizer, a superplasticizer, a pigment, a corrosion inhibitor, a bonding agent, or a pumping agent, or a combination thereof.

Embodiment 20

The composition according to any preceding embodiment, further comprising a reinforcement structure.

Embodiment 21

The composition of any preceding embodiment, wherein the composition exhibits a compressive strength of greater than 0 MPa after 3 days of curing.

Embodiment 22

The composition according to any preceding embodiment, wherein the composition exhibits a compressive strength of at least 5 MPa after 3 days of curing.

Embodiment 23

The composition according to any preceding embodiment, wherein the composition exhibits a compressive strength of at least 10 MPa after 3 days of curing.

Embodiment 24

The composition according to any preceding embodiment, wherein the composition exhibits a compressive strength of at least 20 MPa after 3 days of curing.

Embodiment 25

The composition according to any preceding embodiment, wherein the composition exhibits a compressive strength of at least 30 MPa after 3 days of curing.

Embodiment 26

The composition according to any preceding embodiment, wherein the composition exhibits a compressive strength of at least 40 MPa after 3 days of curing.

Embodiment 27

The composition according to any preceding embodiment, wherein the composition exhibits a compressive strength of at least 5 MPa after 7 days of curing.

Embodiment 28

The composition according to any preceding embodiment, wherein the composition exhibits a compressive strength of at least 10 MPa after 7 days of curing.

Embodiment 29

The composition according to any preceding embodiment, wherein the composition exhibits a compressive strength of at least 20 MPa after 7 days of curing.

Embodiment 30

The composition according to any preceding embodiment, wherein the composition exhibits a compressive strength of at least 30 MPa after 7 days of curing.

Embodiment 31

The composition according to any preceding embodiment, wherein the composition exhibits a compressive strength of at least 40 MPa after 7 days of curing.

Embodiment 32

The composition according to any preceding embodiment, wherein the composition exhibits a compressive strength of at least 50 MPa after 7 days of curing.

Embodiment 33

The composition according to any preceding embodiment, wherein the composition exhibits a compressive strength of at least 60 MPa after 7 days of curing.

Embodiment 34

The composition according to any preceding embodiment, wherein the composition exhibits a compressive strength of at least 70 MPa after 7 days of curing.

Embodiment 35

The composition according to any preceding embodiment, wherein the composition exhibits a compressive strength of at least 80 MPa after 7 days of curing.

Embodiment 36

The composition according to any preceding embodiment, wherein the composition exhibits a compressive strength of at least 40 MPa after 28 days of curing.

Embodiment 37

The composition according to any preceding embodiment, wherein the composition exhibits a compressive strength of at least 50 MPa after 28 days of curing.

Embodiment 38

The composition according to any preceding embodiment, wherein the composition exhibits a compressive strength of at least 60 MPa after 28 days of curing.

Embodiment 39

The composition according to any preceding embodiment, wherein the composition exhibits a compressive strength of at least 70 MPa after 28 days of curing.

Embodiment 40

The composition according to any preceding embodiment, wherein the composition exhibits a compressive strength of at least 80 MPa after 28 days of curing.

Embodiment 41

The composition according to any preceding embodiment, wherein the composition after mixing with water exhibits a slump value of at least 1 mm as defined by BS EN 206-1.

Embodiment 42

The composition according to any preceding embodiment, wherein the composition after mixing with water exhibits a slump value of at least 20 mm as defined by BS EN 206-1.

Embodiment 43

The composition according to any preceding embodiment, wherein the composition after mixing with water exhibits a slump value of at least 40 mm as defined by BS EN 206-1.

Embodiment 44

The composition according to any preceding embodiment, wherein the composition after mixing with water exhibits a slump value of at least 60 mm as defined by BS EN 206-1.

Embodiment 45

The composition according to any preceding embodiment, wherein the composition after mixing with water exhibits a slump value of at least 70 mm as defined by BS EN 206-1.

Embodiment 46

The composition according to any preceding embodiment, wherein the composition after mixing with water exhibits a slump value of at least 80 mm as defined by BS EN 206-1.

Embodiment 47

The composition according to any preceding embodiment, wherein the composition after mixing with water exhibits a slump value of at least 100 mm as defined by BS EN 206-1.

Embodiment 48

The composition according to any preceding embodiment, wherein the composition after mixing with water exhibits a slump value of at least 110 mm as defined by BS EN 206-1.

Embodiment 49

The composition according to any preceding embodiment, wherein the composition after mixing with water exhibits a slump value of at least 120 mm as defined by BS EN 206-1.

Embodiment 50

The composition according to any preceding embodiment, wherein the composition after mixing with water exhibits a slump value of at least 130 mm as defined by BS EN 206-1.

Embodiment 51

The composition according to any preceding embodiment, wherein the composition is concrete.

Embodiment 52

A cementitious product comprising a hydraulically set product formed from the composition according to any preceding embodiment.

Embodiment 53

A method for manufacturing cement that contains electric arc furnace dust, the method comprising: (a) mixing cement ingredients comprising: (i) cement; (ii) an electric arc furnace dust (EAFD); and (iii) a non-chloride cement accelerator; to thereby form a cement mixture; wherein the electric arc furnace dust is present in an amount from greater than 0 wt % to 8 wt % based on the total weight of cement (i).

Embodiment 54

The method of embodiment 53, further comprising setting the cement mixture.

Embodiment 55

The method according to any preceding embodiment, further comprising adding an aggregate component.

Embodiment 56

The method according to any preceding embodiment, further comprising casting the cement mixture to produce cast cement.

Embodiment 57

The method according to any preceding embodiment, wherein the electric arc furnace dust is bag house dust (BHD).

Embodiment 58

The method according to any preceding embodiment, wherein the cement accelerator comprises calcium nitrite, or calcium formate, or a combination thereof.

Embodiment 59

The method according to any preceding embodiment, wherein the cement exhibits a compressive strength of at least 5 MPa after 7 days of curing.

Embodiment 60

The method according to any preceding embodiment, wherein the cement mixture after mixing with water exhibits a slump value at least 1 mm as defined by BS EN 206-1.

Embodiment 61

The method according to any preceding embodiment, wherein the cement mixture after mixing with water exhibits a slump value at least 60 mm as defined by BS EN 206-1.

Embodiment 62

The method according to any preceding embodiment, wherein the cement mixture after mixing with water exhibits a slump value at least 130 mm as defined by BS EN 206-1.

Embodiment 63

A product made by the method according to any preceding embodiment.

Without further elaboration, it is believed that one skilled in the art can, using the description herein, utilize the present invention. The following examples are included to provide addition guidance to those skilled in the art of practicing the claimed invention. The examples provided are merely representative of the work and contribute to the teaching of the present invention. Accordingly, these examples are not intended to limit the invention in any manner.

Throughout this application, various publications may be referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present invention is not entitled to antedate such publication by virtue of prior invention. Further, the dates of publication provided herein may be different from the actual publication dates, which can require independent confirmation.

EXAMPLES

The following examples are put forth so as to provide those of ordinary skill in the art with a complete disclosure and description of how the methods, devices, and systems disclosed and claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in C or is at ambient temperature, and pressure is at or near atmospheric. Unless indicated otherwise, percentages referring to composition are in terms of wt %. There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

Materials

For all of the following non-limiting Examples, the cement (paste), mortar, and concrete compositions were prepared from the components described in Table 2 and in more detail below.

TABLE 2

| Item | Description | Supplier |
|---|---|---|
| OPC | Saudi ordinary Portland cement (OPC-Type I) | Saudi Cement Company |
| BHD | Bag house dust (electric arc furnace dust) | Saudi Basic Industries Corp. |
| CN | Calcium nitrite (min 94% calcium nitrite; max. 4.5% calcium nitrate) | Wintersun Chemical Group |
| CF | Calcium formate (min 98% purity) | Fisher Scientific |
| AGG | Course siliceous rounded river gravel with a maximum size of 14 mm | Local source; Birmingham UK |
| FA | Fine quartzite sand | Tarmac Roadstone Ltd |

Saudi ordinary Portland cement (OPC-Type I) was used for all examples herein. The chemical analysis and physical properties of the Saudi ordinary Portland cement (OPC-Type I) provided by the manufacturer are described in Table 3 below.

TABLE 3

| Constituents | Weight (%) |
|---|---|
| Silicon dioxide ($SiO_2$) | 21.52 |
| Aluminum oxide ($Al_2O_3$) | 4.64 |
| Ferric oxide ($Fe_2O_3$) | 3.09 |
| Calcium oxide (CaO) | 65.31 |
| Magnesium oxide (MgO) | 1.59 |
| Sulfur trioxide ($SO_3$) | 2.25 |
| Tricalcium silicate ($C_3S$) | 60.3 |
| Dicalcium silicate ($C_2S$) | 16.2 |
| Tricalcium aluminate ($C_3A$) | 7.1 |
| Tetracalcium aluminoferrite | 9.4 |
| LOI (loss on ignition) | 1.12 |
| Fineness, $cm^2/gm$ | 3540 |

Bag house dust (BHD) was used to prepare all the examples herein, and was provided as an additional material as weight % based on the total starting weight of the dry cement. The chemical composition of BHD analyzed by X-ray fluorescence spectrometry (XRF) is described in Table 1 above. Two exemplary non-chloride accelerators, calcium nitrite (CN) and calcium formate (CF), were used to prepare all the examples herein. The non-chloride accelerators were provided as an additional material as weight % based on the total starting weight of the dry cement.

Siliceous aggregate was used to prepare all the examples herein. The fine aggregate (FA) used in all the examples herein was clean quartzite sand. The coarse aggregate (AGG) used in all the examples herein was siliceous rounded river gravel with a maximum size of 14 mm Sieve grading of the aggregates was performed per test methods of BS 812-103.1. The sieve analysis data of the fine aggregate (FA) and coarse aggregate (AGG), and the limits as specified in BS EN 12620, are described in Table 4 and Table 5, respectively.

TABLE 4

| Sieve size | Passing (%) | Limits (F grading) |
|---|---|---|
| 10 mm | 100 | — |
| 5 mm | 96 | — |
| 2.36 mm | 85.2 | 80-100 |
| 1.18 mm | 78.9 | 70-100 |
| 600 μm | 70 | 55-100 |
| 300 μm | 35.6 | 5-70 |
| 150 μm | 14.1 | — |

TABLE 5

| Sieve size (mm) | Passing (%) |
|---|---|
| 50 | — |
| 37.5 | — |
| 20 | — |
| 14 | 100 |
| 10 | 76.5 |
| 5 | 9.61 |
| 2.36 | 1.44 |

General Procedures

The disclosed cement compositions according to the formulations set forth in Table 6 using the materials described in Table 2 were used to prepare cement paste, mortar, and concrete example specimens. For the examples herein, "cement" or "cement paste" is cement and water, and when present, BHD and/or non-chloride accelerator. "Mortar" is cement, fine aggegrate, and water, and when present, BHD and/or non-chloride accelerator. "Concrete" is cement, fine aggregate, coarse aggregate, and water, and when present, BHD and/or non-chloride accelerator. Unless otherwise described, the materials were provided as an additional material as weight % based on the total starting weight of the dry cement. All the components were prepared prior to mixing, and the mixing procedures were carried out according to ASTM C 305.

The following procedures were used to prepare the cement paste and mortar examples herein. All the cement paste and mortar examples herein were prepared at a constant water/cement ratio of 0.4. First, the BHD, when present, was introduced by mixing the required proportion of BHD with the cement powder, and manually dry mixed to ensure adequate dispersion of BHD particles in the resulting mixture. For the mortar specimens, fine quartzite sand was added and mixed thoroughly. Non-chloride accelerators, when present, were first dissolved in the mixing water, and then added to the dry components. After the water was added, all constituents were then manually mixed together for 4-5 minutes until a uniform consistency was achieved. The resulting mixture was cast in molds corresponding to each experiment. The casting process was carried out in two layers, where each layer was table vibrated lightly to remove air and minimize segregation. The top surface containing the air bubbles was removed using a straight edge, and fresh mixture was added to fill the mold. This vibration and filling process was repeated as necessary.

All the cement examples herein were cast in 50 mm cube molds. Eighteen cubes were cast from each formulation described herein. All the examples herein were cured at room temperature in the molds for the first 3 days and then in a sealed container filled with water-saturated, $CO_2$-free air until required for testing.

All the concrete examples herein were prepared according to the following procedures. All the concrete examples herein were prepared with a W:C:FA:AGG (water:cement:fine aggregate:course aggregate) ratio of 0.4:1:1.2:2.2 by weight of cement. The required proportion of BHD, when present, was first added to the dry cement and then manually dry mixed to ensure proper dispersion of BHD particles with the cement. Thereafter, fine and coarse aggregates were added and mixed thoroughly. Mixing water was then added and all constituents were mixed together for 4-5 minutes. Non-chloride accelerators, when present, were dissolved in the mixing water prior to adding to the dry constituents. All of the concrete examples were cast in the appropriate mold and then compacted using a vibrator table as described herein. Before demolding, the concrete examples were covered with wet burlap to minimize water evaporation. The control concrete examples were demolded after 24 hours and the BHD concrete examples were kept in their molds for longer times due to the retarding effect of BHD. All the concrete examples herein were then cured in a fog chamber where the temperature was maintained at 22±2° C. and with a relative humidity of 100% until the appropriate hydration times were achieved. Table 6 below provides a summary of compositions of all the examples tested.

TABLE 6

| Formulation No. | BHD, wt % | Non-chloride accelerator, wt % |
| --- | --- | --- |
| 1 (Control) | 0 | 0 |
| 2 (Comparative Example) | 8 | 0 |
| 3 (Comparative Example) | 0 | 3.5% CN |
| 4 (Comparative Example) | 0 | 3.5% CF |
| 5 (Representative Example) | 8 | 3.5% CN |
| 6 (Representative Example) | 8 | 3.5% CF |

All of the examples herein underwent several tests and studies, including workability, setting time, compressive strength, ultrasonic pulse velocity (UPV) and thermal analysis studies. The tests performed on all the examples are summarized below.

Workability for all the concrete examples herein was determined using slump tests according to BS EN 12350-2. Workability refers to the ability of a fresh cement or concrete mixture to fill the form/mold properly with the desired work (vibration) and without reducing the mixture's quality. The tests were used to evaluate the consistence of the examples. Data below are provided for slump in mm.

Initial and final setting times were determined for the mortar examples described herein per test methods of BS EN 480-2 using a Vicat apparatus. The Vicat apparatus consisted primarily of a plunger with a needle attached at the end and a mold provided with a glass base plate. Before filling, the mold was placed on a greased base plate to prevent water leaks from the bottom of the mold. The mold was then filled with a sample which was prepared as described herein. After filling, excess material was removed carefully with a straight edge leaving the mold with a flat surface. Data below are provided for initial and final setting times in hours and minutes.

Compressive strength for all of the cement paste and concrete examples herein was determined per test methods of BS EN 12390-3. The tests were used to measure the compressive strength development of all the cement paste and concrete examples. The cement paste and concrete examples herein were crushed to determine compressive strengths after a curing period of 3, 7 and 28 days. Data below are provided for compressive strength in MPa.

Ultrasonic pulse velocity (UPV) of all the cement paste examples herein was determined per test methods of BS EN 12504-4. The tests were carried out at resonant frequencies of 54 KHz using a PUNDIT® 7 Ultrasonic Pulse Velocity (UPV) Tester. The UPV test provides evidence of the mechanical properties of development during the hardening/stiffening of concrete and is considered a non-destructive technique, permitting repeated tests on the same concrete specimen without causing any damage. When a good relationship between strength and UPV is obtained for a particular example, UPV values can also be used to predict the strength of hardened cement or concrete. Data below are provided for UPV in km/s.

Thermal analysis studies for all of the cement examples herein were carried out as described below. The studies were conducted using a NETZSCH® STA 449 C thermal analyzer to provide simultaneous thermogravimetry (TG) and differential scanning calorimetry (DSC) measurements. DSC is a technique for identifying various materials that undergo physical or chemical transformations with associated energy changes which can be measured when a gradual heating program is applied. Thus, the TG/DSC studies measures the effects of CN and CF presence on hydration in the representative BHD-cement example by comparing the quantity of the hydration products formed at specific ages. For TG/DSC studies, one specimen was selected from each formulation. The selected specimens were ground using mortar and pestle until they passed through a 0.5 mm sieve. To stop further hydration of the cement, acetone was added to the ground material, followed by stirring and then the material was left to dry out by allowing the acetone to evaporate slowly. Prior to TG/DSC analysis, the dried samples were stored in a vacuum desiccator over silica gel and soda lime before being ground to pass a 63 μm sieve. The TG/DSC studies were carried out in an argon atmosphere over a temperature range from room temperature to 800° C. using a heating rate of 10° C. per minute. The reference standard sample used was alumina, $Al_2O_3$. The sample to be tested was placed in one cavity and a thermally inactive reference material (alumina) was placed in the second cavity. Both the specimen and the reference were subjected to a uniform heating rate. The temperature difference ($\Delta T$) between the sample (Ts) and reference (Tr) were maintained throughout the controlled temperature program ($\Delta T=Ts-Tr=0$). The resulting difference of heat flow ($\Delta Q$), i.e. amount of energy, between the materials was recorded as a function of temperature and/or time, where $\Delta Q$ depends on the exo- or endothermal character of the transformation occurring in the test sample. For example, in one aspect, during the decomposition process, the observed $\Delta Q$ can be positive indicating an endothermal process. In a further aspect, for the specimens of hydrated cement, hydration products that undergo thermal decomposition at particular ranges of temperature are also identifiable by their endothermal $\Delta Q$ peaks on the DSC trace. Specimen size for the TG/DSC studies was between 20 and 40 mg. Data below are provided for TG/DSC in % and J/g.

Example 1

Table 7 below shows the slump values for all the concrete examples prepared as described herein. The control example, which contained no BHD or non-chloride accelerators, exhibited a slump value of 43 mm. As can be seen from the data provided in Table 7, the comparative example comprising only 8% BHD resulted in substantial reduction in the workability and consistence of the composition. In fact, the example containing only 8% BHD exhibited essentially zero slump. Without wishing to be bound by a particular theory, this reduction is potentially related to the fine spherical size and high specific surface of BHD. To this end, finer particles typically require more water to lubricate the larger surface area.

As provided in Table 7, the examples comprising only 3.5% CN or 3.5% CF appear to exhibit an increased workability. Moreover, the workability and consistence of the representative 8% BHD examples comprising 3.5% CN or 3.5% CF effectively improved, showing consistences in the S2 and S3 classes, respectively as defined by BS EN 206-1. Further, without wishing to be bound by a particular theory, the mechanisms of these effects are thought to be dependent on the ability of the two representative examples to deflocculate aqueous dispersions of BHD/cement powder, releasing water trapped within clusters of particles and facilitating flow of the fresh paste.

TABLE 7

| Sample | Slump (mm) |
|---|---|
| Control | 43 |
| 8% BHD only | 0 |
| 3.5% CN only | 90 |
| 3.5% CF only | 74 |
| 8% BHD + 3.5% CN | 60 |
| 8% BHD + 3.5% CF | 130 |

Example 2

Table 8 below shows the initial and final setting times for all the mortar examples prepared as described herein. Examples containing BHD exhibited a strong retarding effect on setting times. It is believed that this delay in setting times of BHD examples can be attributed to the consumption of the dissolved calcium and hydroxide ions in the solution due to the formation of calcium hydroxy-zincate, which results in delay of calcium hydroxide precipitation and calcium-silicate-hydrate gel formation. Comparison of the examples shows the setting times of BHD examples were all increased.

TABLE 8

| Sample | Initial setting time | Final setting time |
|---|---|---|
| Control | 4 hrs 10 mins | 5 hrs 55 mins |
| 3.5 CN only | 3 hrs 0 mins | 3 hrs 54 mins |
| 3.5 CF only | 4 hrs 0 mins | 4 hrs 55 mins |
| 8% BHD | 12 hrs 40 mins | 17 hrs 10 mins |
| 8% BHD + 3.5% CN | 18 hrs 38 mins | 23 hrs 50 mins |
| 8% BHD + 3.5% CF | 20 hrs 40 mins | 24 hrs 54 mins |

Example 3

Table 9 shows the compressive strength comparisons between the cement paste examples after 3, 7 and 28 days of curing. As shown by the data, the control cement example (0% BHD and 0% CN/CF) achieved an average strength value of 20.4 MPa within 3 days. In contrast, the 8% BHD-only cement examples failed to develop any compressive strength. In fact, it appears that the addition of 8% BHD effectively suppressed hardening of the composition for at least 7 days. The 8% BHD-only cement examples did, however, show higher compressive strength values at 28 days compared to the control values. This severe retardation in compressive strength development is consistent with the significant delay in cement hydration reactions resulting from higher BHD levels.

An improvement was observed in the strength development of the representative BHD cement examples (8% BHD and 3.5% CN/CF). At 3 days, both representative examples were able to achieve small gains in compressive strength. However, the representative cement examples were able to attain considerably improved strength values when compared to control specimens at both 7 and 28 days. Significantly, the representative cement examples exhibited early strength development, achieving meaningful compressive strength at 7 days, as represented by FIG. 1.

Figure 2:
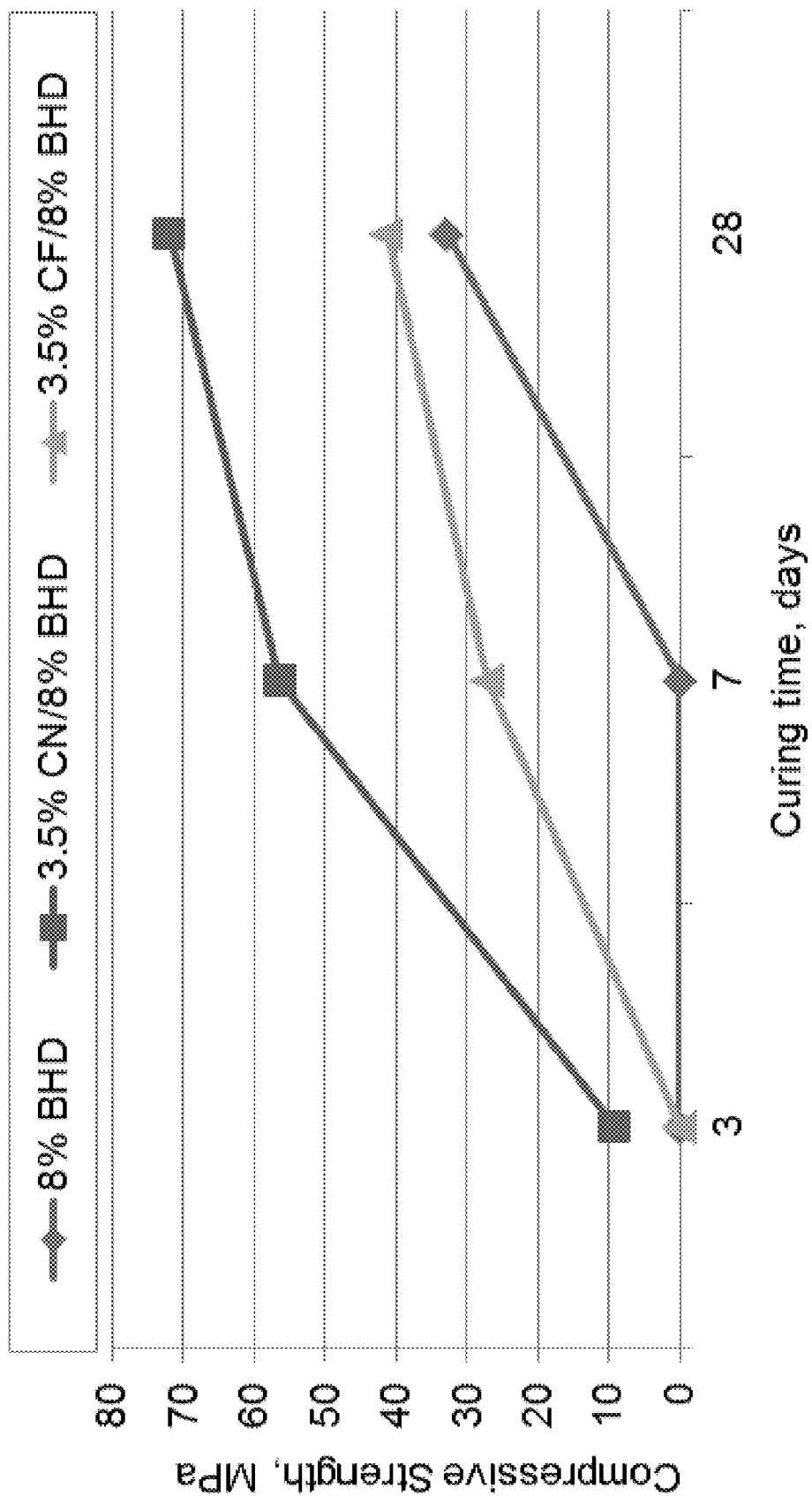
FIG. 2 shows representative compressive strength data for two representative disclosed concrete compositions of the present invention compared to representative comparative samples.

Strength development for all the concrete examples herein was also evaluated. As shown in FIG. 2, the 8% BHD-only concrete examples produced broadly similar results to those obtained from the corresponding cement examples, showing no measurable compressive strength development during the first 7 days. Again, the representative concrete examples (8% BHD and 3.5% CN/CF) were able to achieve improved strength values when compared to control values at both 7 and 28 days. Likewise, the representative concrete examples also exhibited early strength development, achieving meaningful compressive strength at 7 days.

These results indicate the inventive compositions do not exhibit the excessive hardening retardation seen in other BHD cement or concrete compositions. Without wishing to be bound by a particular theory, the increase in compressive strength of the inventive compositions may be attributed to improvement in hydration of $C_2S$ and $C_3S$ in the concrete, and thus more hydration products. To this end, an increase in the formation of hydration products, such as, CH and C—S—H, was observed with the inventive cement compositions as discussed further in the TG/DSC section.

Thus, the inventive compositions can exhibit significantly improved compressive strength, and make it possible, in various aspects, to effectively overcome BHD-induced retardation, caused by the presence of BHD, up to 8 wt % of cement.

TABLE 9

| | Curing (days) | | | | | | | | | | | |
|---|---|---|---|---|---|---|---|---|---|---|---|---|
| | 3 | | | | 7 | | | | 28 | | | |
| | BHS (%) | | | | | | | | | | | |
| | 0 | 8 | 8 | 8 | 0 | 8 | 8 | 8 | 0 | 8 | 8 | 8 |
| | Accelerator (%) | | | | | | | | | | | |
| | 0 | 0 | 3.5 CN | 3.5 CF | 0 | 0 | 3.5 CN | 3.5 CF | 0 | 0 | 3.5 CN | 3.5 CF |
| Cube 1 (MPa) | 20.5 | 0.0 | 1.1 | 4.5 | 33.7 | 1.0 | 46.4 | 50.6 | 54.2 | 59.0 | 68.6 | 67.4 |
| Cube 2 | 21.2 | 0.0 | 1.1 | 5.0 | 32.8 | 1.1 | 47.7 | 49.6 | 53.4 | 54.3 | 68.7 | 69.0 |

TABLE 9-continued

| | Curing (days) | | | | | | | | | | | |
|---|---|---|---|---|---|---|---|---|---|---|---|---|
| | 3 | | | | 7 | | | | 28 | | | |
| | BHS (%) | | | | | | | | | | | |
| | 0 | 8 | 8 | 8 | 0 | 8 | 8 | 8 | 0 | 8 | 8 | 8 |
| | Accelerator (%) | | | | | | | | | | | |
| | 0 | 0 | 3.5 CN | 3.5 CF | 0 | 0 | 3.5 CN | 3.5 CF | 0 | 0 | 3.5 CN | 3.5 CF |
| Cube 3 (MPa) | 21.2 | 0.0 | 1.2 | 4.3 | 32.9 | 1.0 | 46.9 | 50.1 | 53.5 | 60.7 | 70.2 | 59.8 |
| Cube 4 (MPa) | 20.2 | 0.0 | 1.1 | 4.4 | 31.4 | 1.1 | 44.5 | 50.0 | 52.8 | 62.5 | 67.2 | 62.8 |
| Cube 5 (MPa) | 20.0 | 0.0 | 1.2 | 4.5 | 35.0 | 1.1 | 44.0 | 47.8 | 55.1 | 59.4 | 68.9 | 64.0 |
| Cube 6 (MPa) | 19.4 | 0.0 | 1.2 | 4.3 | 32.9 | 1.1 | 43.2 | 47.7 | 53.9 | 60.1 | 64.0 | 59.4 |
| Mean (MPa) | 20.4 | 0.0 | 1.1 | 4.5 | 33.1 | 1.1 | 45.5 | 49.3 | 53.8 | 59.3 | 67.9 | 63.7 |
| SD | 0.7 | 0.0 | 0.0 | 0.3 | 1.2 | 0.0 | 1.8 | 1.2 | 0.8 | 2.8 | 2.1 | 3.9 |

Example 4

UPV comparisons between all the cement paste examples after 3, 7 and 28 days of curing are provided in Table 10. All control examples (0% BHD and 0% CN/CF) were able to attain a UPV higher than 2.8 km/s. Contrastly, the 8% BHD-only examples failed to even achieve 1 km/s. The representative examples containing CN or CF exhibited some improvement. At 3 days, both representative examples exhibited higher UPV values compared to the 8% BHD-only example. Interestingly, at 7 days, both representative examples had UPV values comparable to the plain cement control example.

$$f_c = A e^{BV}$$

where $f_c$ is the cement composition compressive strength in MPa, and V is ultrasonic pulse velocity in m/s; and A and B are constant.

Example 5

Thermal analysis of the all cement paste examples herein was performed. TG/DSC analyses were conducted on plain cement examples as a control, 8% BHD-only cement examples and on the representative cement examples containing 8% BHD, and 3.5% CN or 3.5% CF, after curing the specimens for 3, 7 and 28 days.

TABLE 10

| | Curing (days) | | | | | | | | | | | |
|---|---|---|---|---|---|---|---|---|---|---|---|---|
| | 3 | | | | 7 | | | | 28 | | | |
| | BHD (%) | | | | | | | | | | | |
| | 0 | 8 | 8 | 8 | 0 | 8 | 8 | 8 | 0 | 8 | 8 | 8 |
| | Accelerator (%) | | | | | | | | | | | |
| | 0 | 0 | 3.5 CN | 3.5 CF | 0 | 0 | 3.5 CN | 3.5 CF | 0 | 0 | 3.5 CN | 3.5 CF |
| Cube 1 (km/s) | 2.86 | 0.83 | 1.32 | 1.83 | 3.27 | 1.23 | 3.01 | 3.13 | 3.46 | 3.33 | 3.42 | 3.42 |
| Cube 2 (km/s) | 2.87 | 0.85 | 1.29 | 1.85 | 3.21 | 1.16 | 3.03 | 3.23 | 3.42 | 3.31 | 3.36 | 3.42 |
| Cube 3 (km/s) | 2.86 | 0.84 | 1.30 | 1.85 | 3.23 | 1.18 | 3.06 | 3.18 | 3.45 | 3.40 | 3.45 | 3.40 |
| Cube 4 (km/s) | 2.84 | 0.86 | 1.32 | 1.84 | 3.16 | 1.20 | 3.09 | 3.21 | 3.50 | 3.40 | 3.47 | 3.45 |
| Cube 5 (km/s) | 2.87 | 0.85 | 1.30 | 1.82 | 3.23 | 1.18 | 3.03 | 3.11 | 3.45 | 3.38 | 3.50 | 3.40 |
| Cube 6 (km/s) | 2.86 | 0.83 | 1.27 | 1.84 | 3.18 | 1.17 | 3.05 | 3.16 | 3.50 | 3.45 | 3.45 | 3.45 |
| Mean (km/s) | 2.86 | 0.84 | 1.30 | 1.84 | 3.21 | 1.19 | 3.05 | 3.17 | 3.46 | 3.38 | 3.44 | 3.42 |

Figure 3:
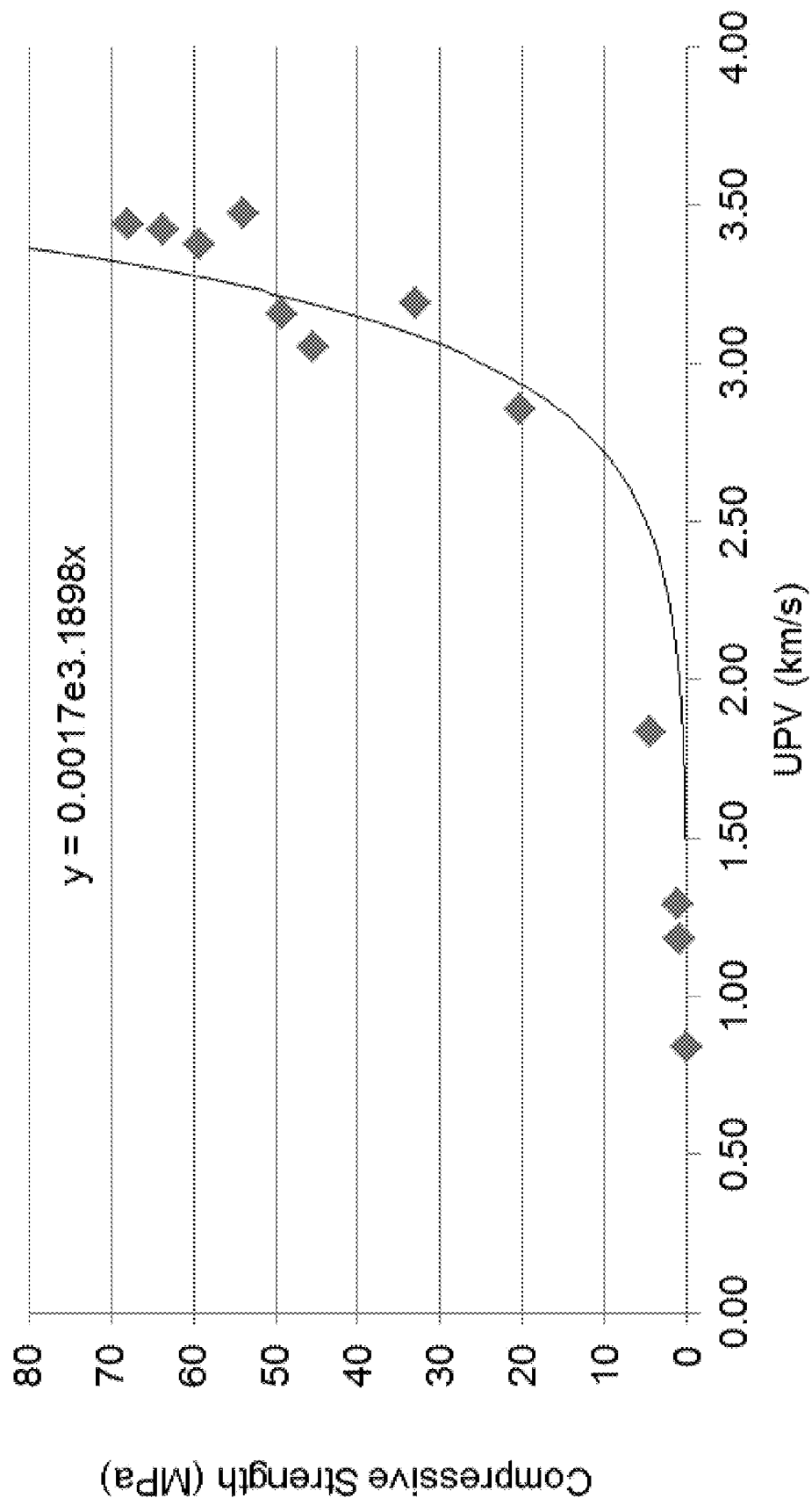
FIG. 3 shows representative data showing the relationship between compressive strength and ultrasonic pulse velocity for representative disclosed cement compositions of the present invention.
Figure 4:
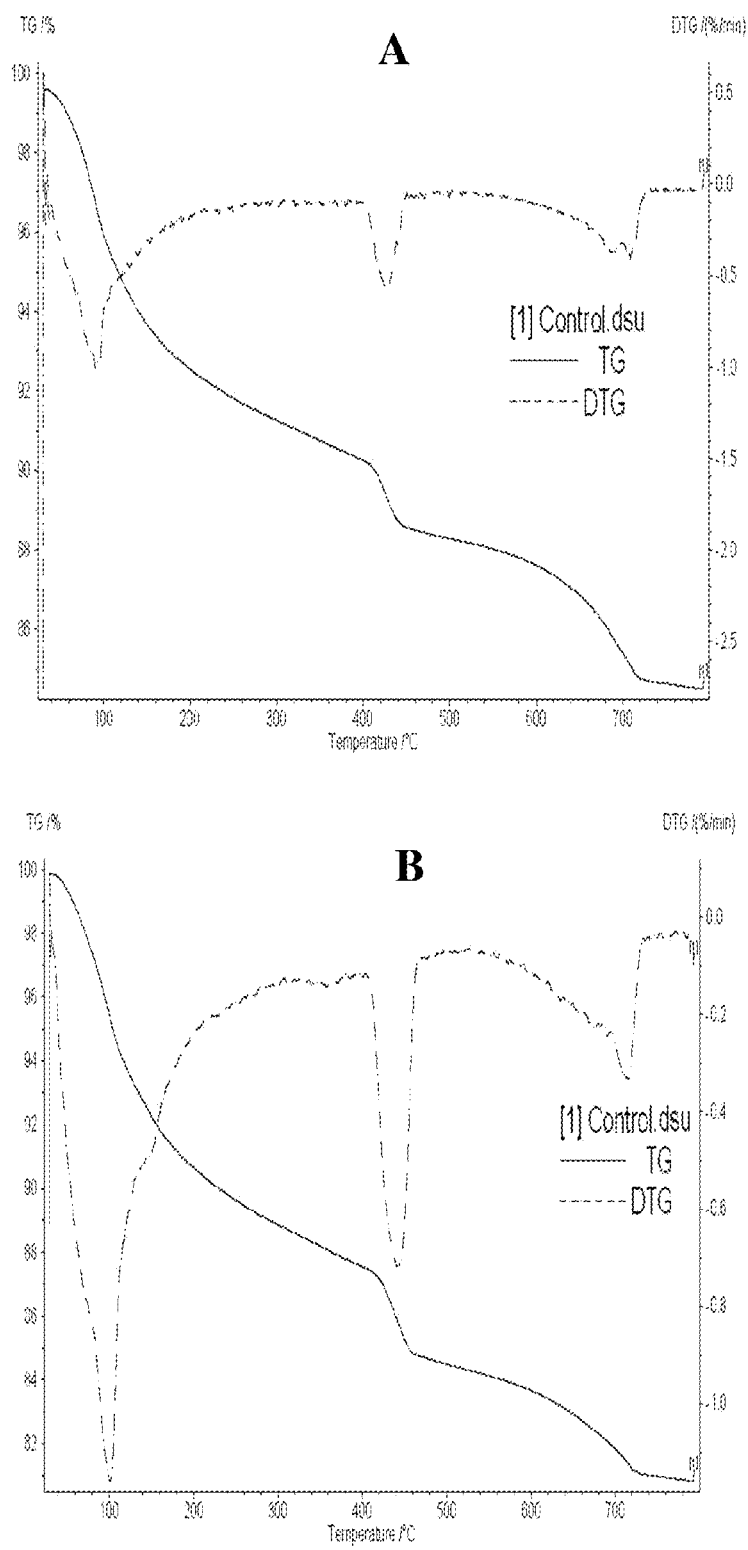
FIG. 4 shows representative TG and DTG data for plain cement comparative composition samples hydrated for (A) 3 days, (B) 7 days and (C) 28 days.
Figure 4:
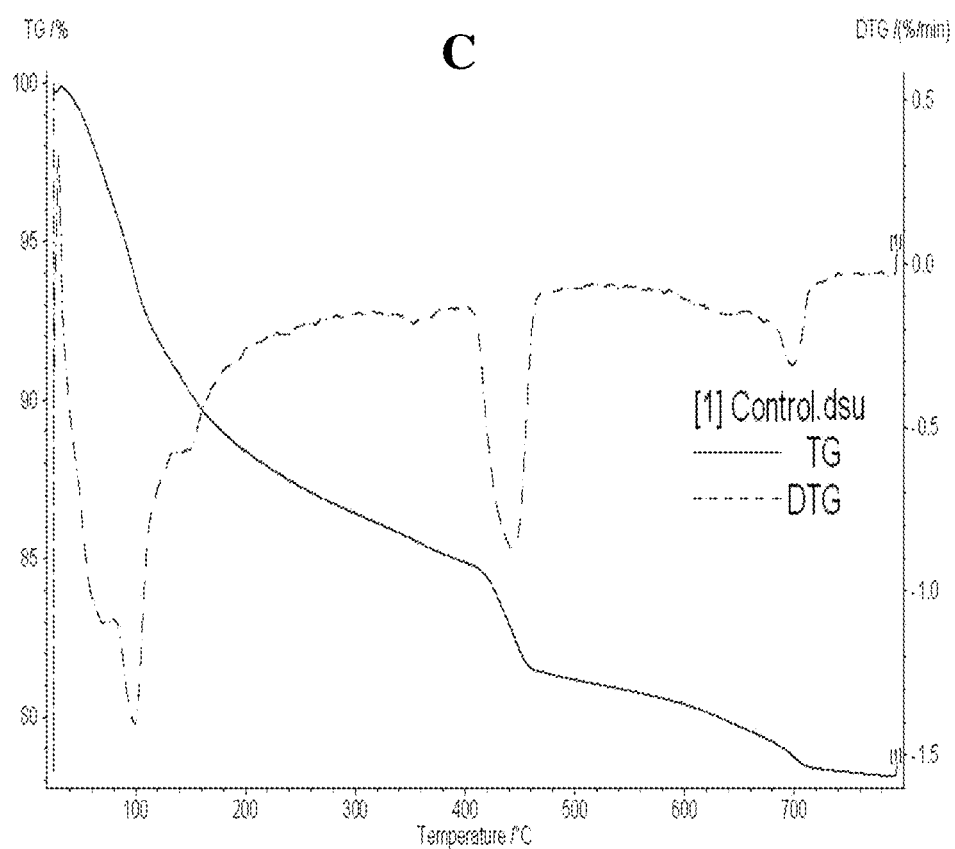

FIG. 3 shows the relationship between the mean cement compressive strength ($f_c$) results and mean ultrasonic pulse velocity (V) values, both obtained from the same specimens. FIG. 3 suggests a reasonably consistent relationship between the cement compressive strength and ultrasonic pulse velocity was established, following the expected exponential form of curve:

With respect to the control example, shown in FIG. 4, the DTG curves exhibit a broad endothermal response over the temperature range 100-200° C. corresponding to the loss of bound water at about 115-125° C. from C—S—H, the principal hydration product of $C_3S$, which accounts for most of the early strength development, and to decomposition of other hydrates, such as ettringite and the AFm phases. At approximately 400-500° C., a clearly defined endothermal peak can be observed, which is consistent with the thermal decomposition of the other hydration product of $C_3S$, namely portlandite. The measure of the quantity of portlandite in the examples is provided by the magnitude of the associated step in the TG response which represents the weight loss associated with the reaction:

$$Ca(OH)_2 \rightarrow CaO + H_2O.$$

The content of the calcium hydroxide formed during hydration was estimated using the following formula:

$$\text{Percentage of Ca(OH)}_2 \text{ content} = \frac{MW_{Ca(OH)_2}}{MW_{H_2O}} WL_{Ca(OH)_2};$$

wherein $MW_{Ca(OH)2}$ is calcium hydroxide molecular weight in g/mol; $MW_{H2O}$ is water molecular weight in g/mol; and $WL_{Ca(OH)2}$ is weight loss due the decomposition of calcium hydroxide in %.

Figure 8:
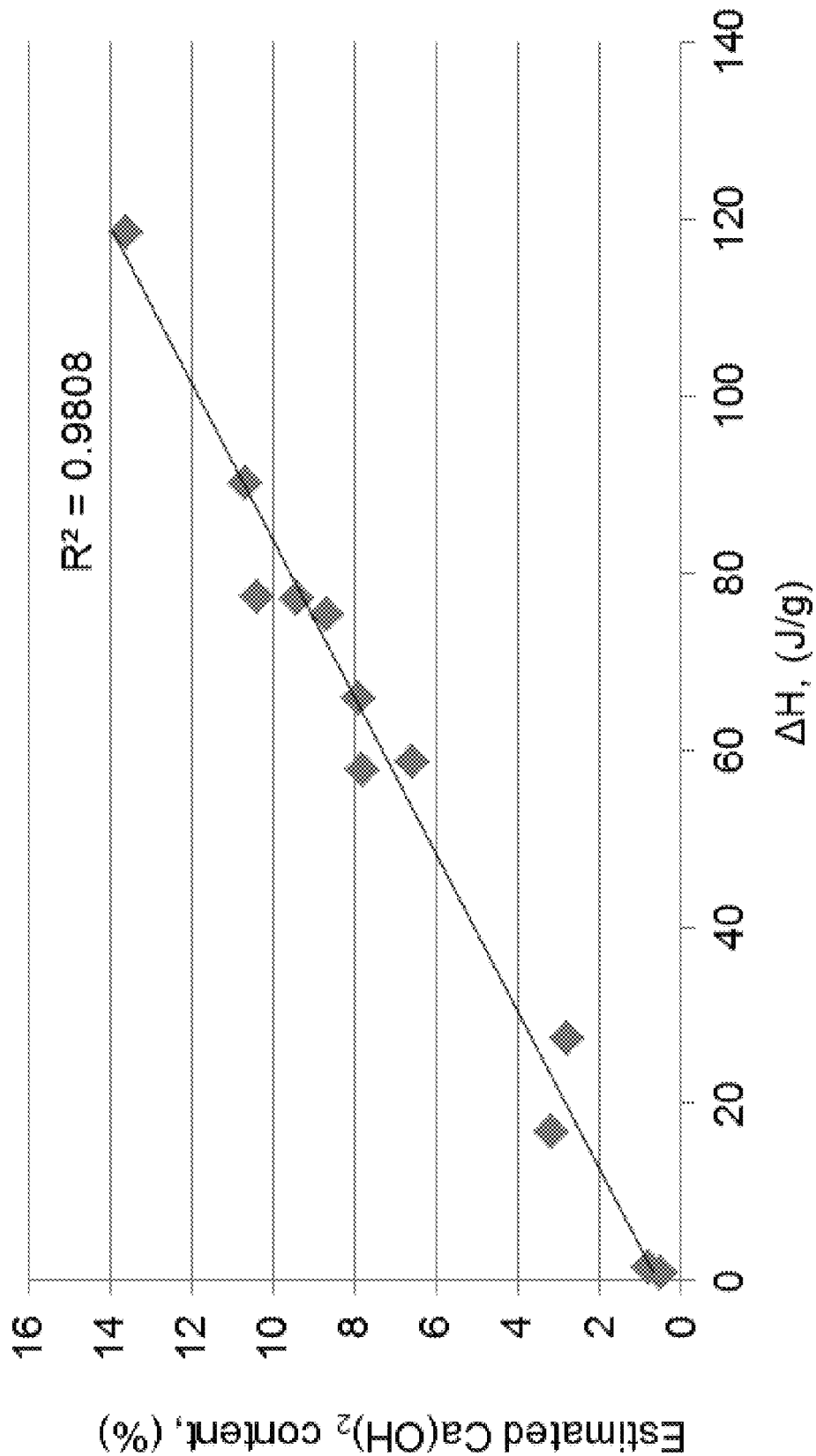
FIG. 8 shows representative data showing relationship between estimated portlandite and enthalpy changes for representative disclosed cement compositions of the present invention.

From DSC studies, the degree of hydration can also be estimated by measuring enthalpy change ($\Delta H$) values that represent the formation of $Ca(OH)_2$. $\Delta H$ is the amount of energy absorbed (heat transferred to the sample) due to the decomposition of hydration products. The $\Delta H$ is related to the area under the endothermal peak, and can be obtained by integration using commercially available software packages. The $\Delta H$ for the examples herein was calculated using Proteus Analysis®—Thermal Analysis version 4.8.3 software package. The $\Delta H$ and estimated portlandite values are presented in Table 11 below. As shown in FIG. 8, a good linear consistent relationship ($R^2$=0.98) between the estimated portlandite content and the $\Delta H$ values was obtained.

TABLE 11

| Sample | Age (Days) | Wt. Loss (%) for Ca (OH)$_2$ | Ca (OH)$_2$ content (%) | $\Delta H$ (J/g) for CH |
|---|---|---|---|---|
| Control | 3 | 1.6 | 6.6 | 58.8 |
|  | 7 | 2.59 | 10.7 | 90.31 |
|  | 28 | 3.3 | 13.6 | 118.6 |
| 8% BHD only | 3 | 0.12 | 0.5 | 1.102 |
|  | 7 | 0.19 | 0.8 | 1.742 |
|  | 28 | 2.12 | 8.7 | 75.45 |
| 8% BHD/3.5% CF | 3 | 0.67 | 2.8 | 27.61 |
|  | 7 | 1.93 | 7.9 | 65.97 |
|  | 28 | 2.28 | 9.4 | 77.14 |
| 8% BHD/3.5% CN | 3 | 0.78 | 3.2 | 16.98 |
|  | 7 | 1.9 | 7.8 | 57.94 |
|  | 28 | 2.52 | 10.4 | 77.43 |

Figure 5:
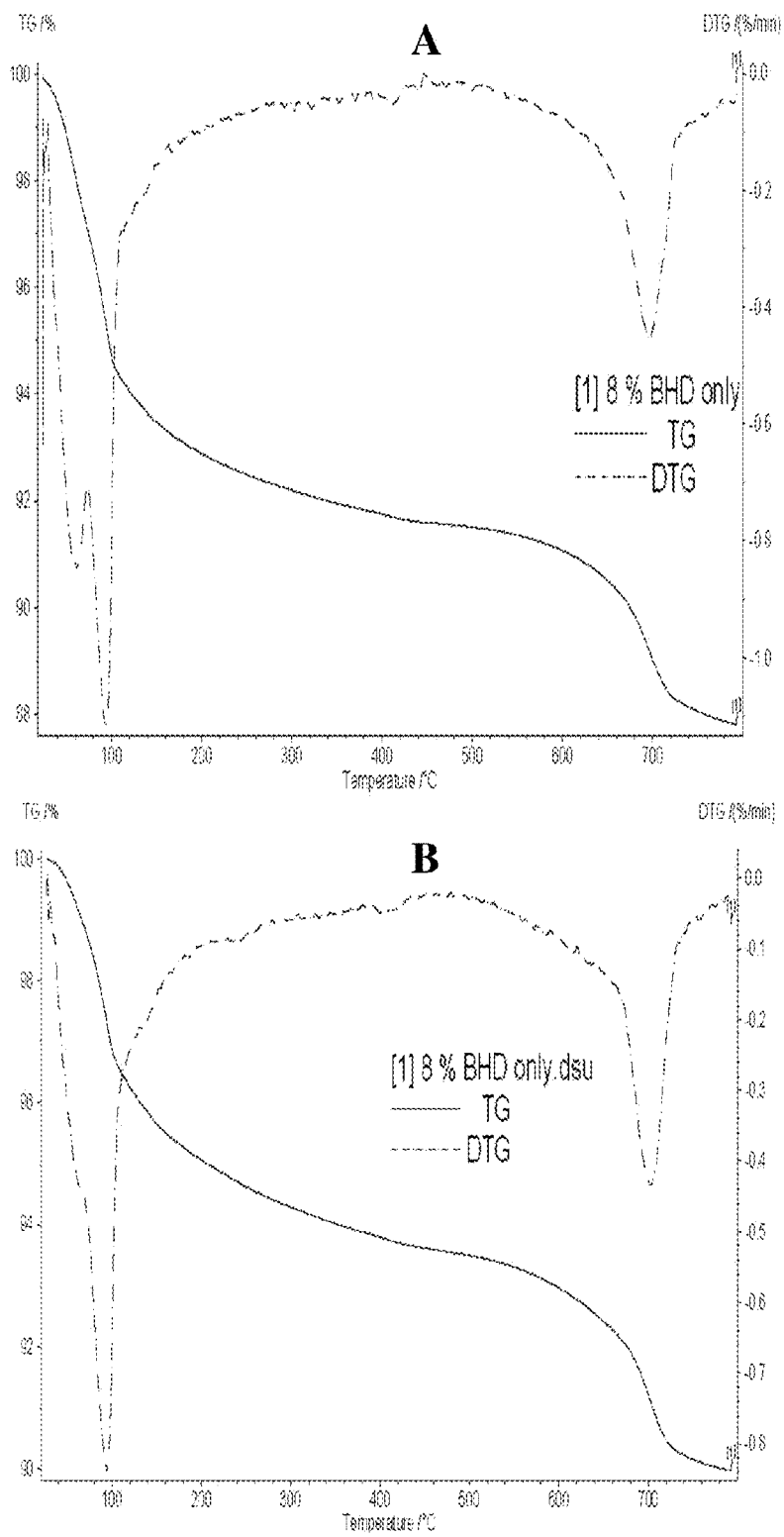
FIG. 5 shows representative TG and DTG data for BHD-cement comparative composition samples hydrated for (A) 3 days, (B) 7 days and (C) 28 days.
Figure 5:
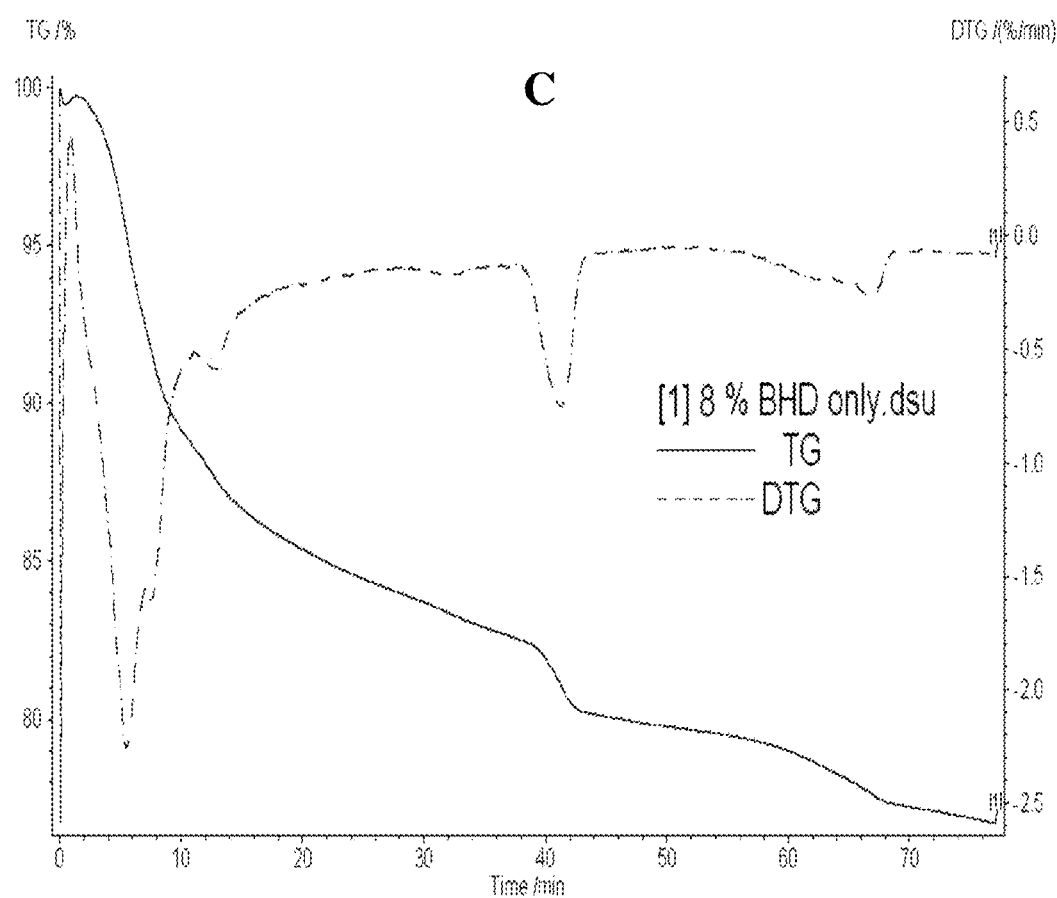

FIG. 4 through FIG. 7 shows the TG/DTG curves for each cement example at day 3 (A), day 7 (B), and day 28 (C). As represented in FIGS. 5 (A) and (B), the DTG curves for 8% BHD-only examples show very small or negligible endothermal peaks at approximately 410° C., suggesting little formation of portlandite, and almost complete blockade of hydration of $C_3S$ through the first 7 days of curing. FIG. 5 (C) shows a higher endothermal peak detected for 28 day cured specimens, indicating the start of the hydration reaction.

Figure 6:
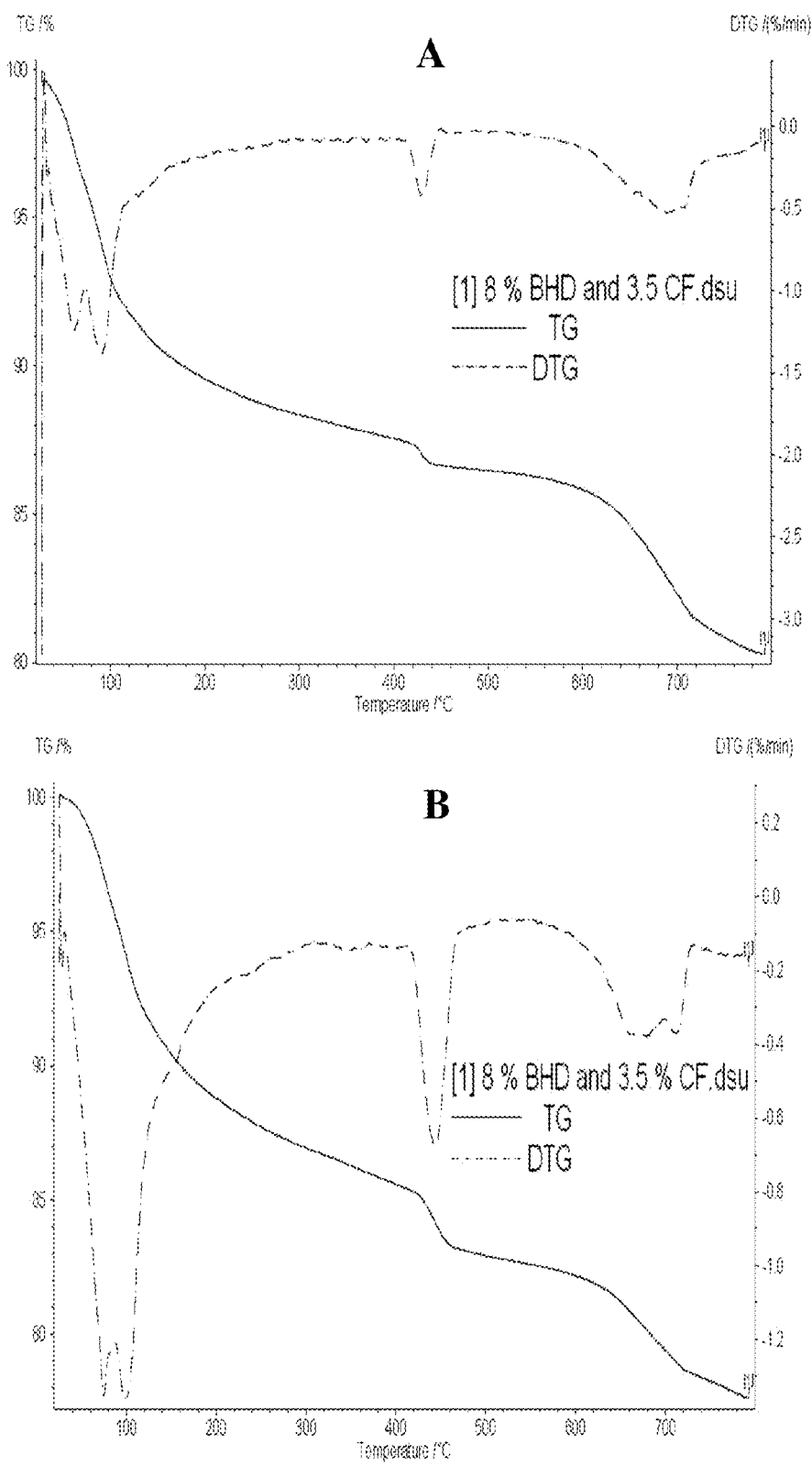
FIG. 6 shows representative TG and DTG data for a representative disclosed cement composition of the present invention hydrated for (A) 3 days, (B) 7 days and (C) 28 days.
Figure 6:
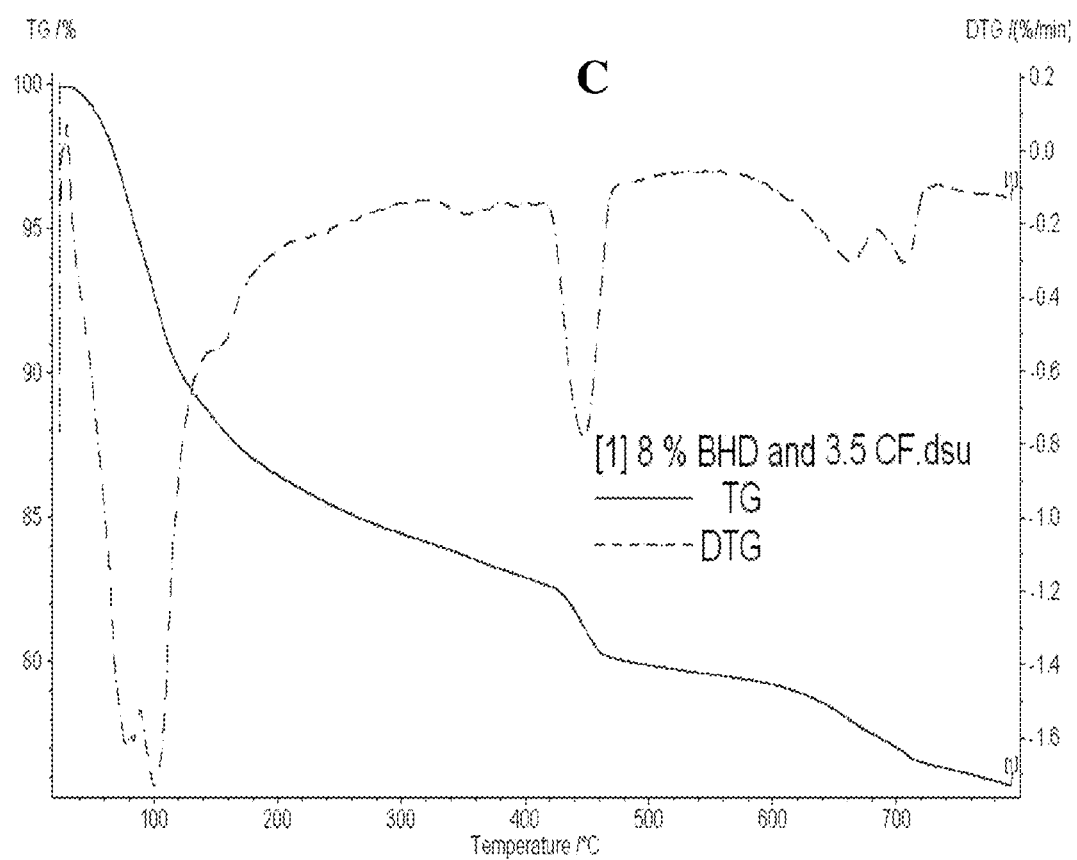
Figure 7:
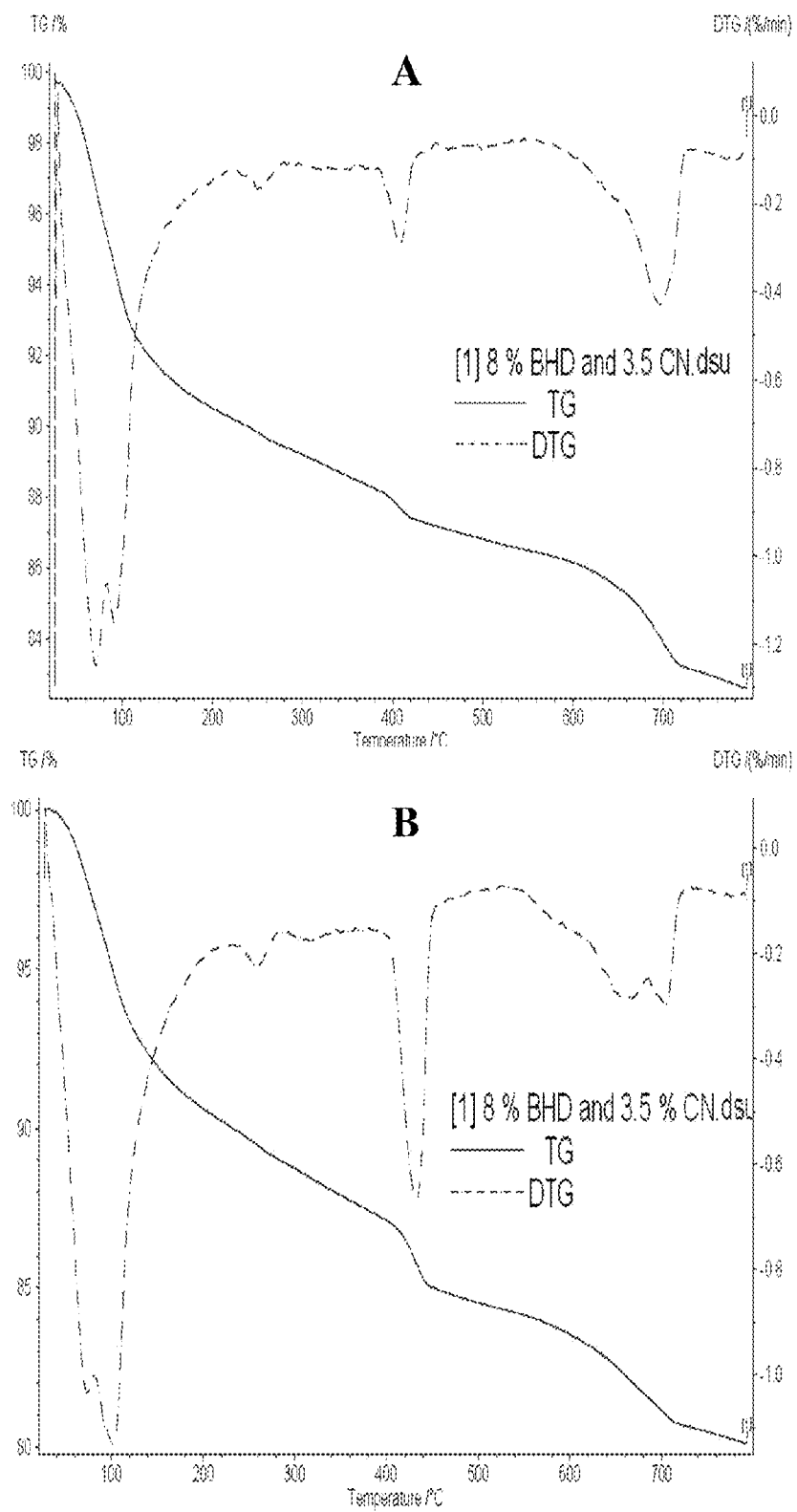
FIG. 7 shows representative TG and DTG data for a representative disclosed cement composition of the present invention hydrated for (A) 3 days, (B) 7 days and (C) 28 days.
Figure 7:
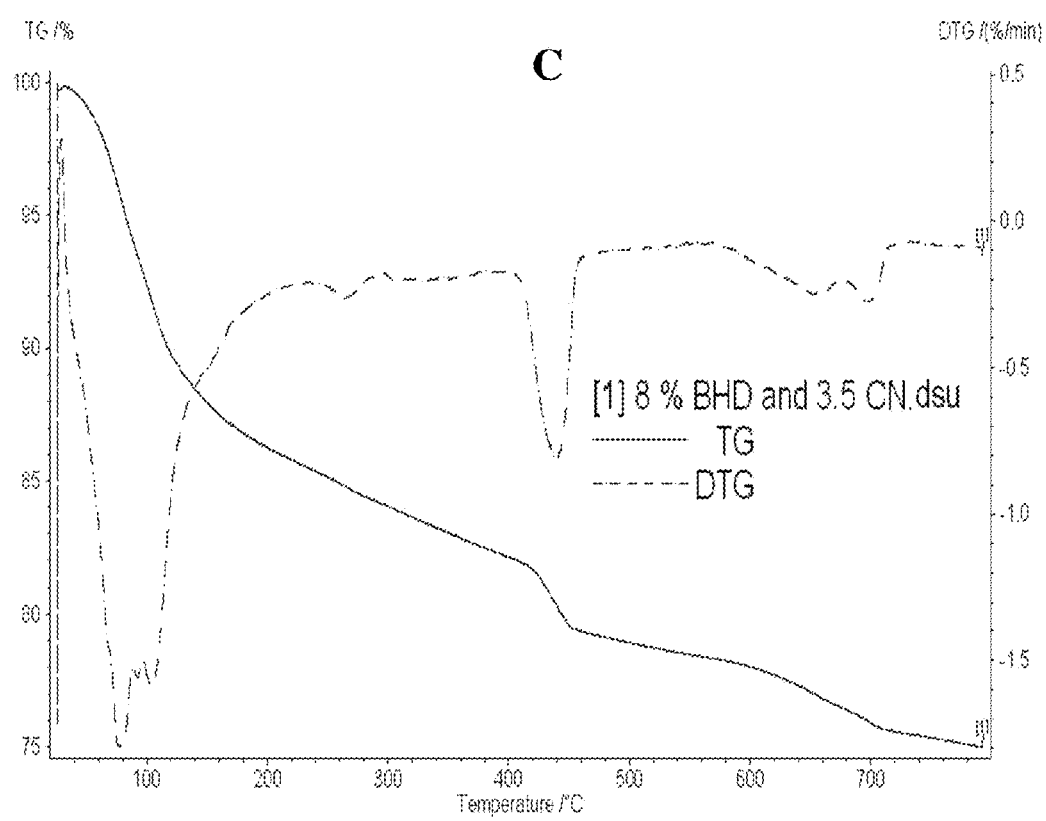

As shown by the DTG/TG curves in FIGS. 6 and 7, both representative examples resulted in major endothermal peaks at all stages of hydration. FIGS. 6 and 7 are consistent with the presence of hydration products of $C_3S$. From the same representative example specimens, appreciable quantities of portlandite were found even after 3 days, indicating a higher degree of hydration.

Although the mechanism of retardation of cement hydration by zinc and lead compounds remains incompletely understood, it is believed that delayed precipitation of calcium hydroxide and C—S—H may be associated with the prior formation of calcium hydroxy-zincate or plumbate species which consume $Ca^{2+}$ and $OH^-$ from the pore solution. The representative examples, in various aspects, appear to provide additional sources of $Ca^{2+}$ from the CN and CF, and may thus reduce the time required to achieve supersaturation of the solution with respect to $Ca(OH)_2$. In a further aspect, the continuing availability of CN after 3 days of curing is represented by the small endothermal peak at about 250° C. in FIG. 7. At this temperature, the calcium nitrite decomposes into calcium oxide and a mixture of nitrogen dioxides according to following equation:

$$Ca(NO_2)_2 \rightarrow CaO + NO + NO_2.$$

The endothermal peaks present within temperatures range of 650-800° C., which were exhibited by all the examples, correspond with the presence of calcium carbonate, which is consistent with up to 5% limestone content as a permitted constituent of Type I cements conforming to ASTM C150/C150M-09.

Without wishing to be bound by a particular theory, the BHD-induced retardation of cement hydration is consistent with the presence of a high level of zinc and, to a lesser extent, lead in the material, which effectively blocks the hydration of the $C_3S$ component of the cement for several days. In various aspects, it has been found that the compositions according to the present invention can overcome the long delay in formation of the hydration products of the $C_3S$ component of the cement caused by the presence of BHD.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A cement composition comprising:
   a. cement;
   b. an electric arc furnace dust (EAFD); and
   c. a non-chloride cement accelerator;
   wherein the electric arc furnace dust is present in an amount from greater than 6 wt % to 8 wt % based on the total weight of cement (a).

2. The composition of claim 1, further comprising an aggregate component.

3. The composition of claim 2, wherein the aggregate component comprises sand, gravel, limestone, granite, marble, or stone, or a combination thereof.

4. The composition of claim 1, wherein the cement comprises Ordinary Portland Cement (OPC) Type I, Type II, Type III, Type IV, or Type V, or a combination thereof.

5. The composition of claim 1, wherein the electric arc furnace dust is bag house dust (BHD).

6. The composition of claim 1, wherein the cement accelerator comprises calcium nitrite, or calcium formate, or a combination thereof.

7. The composition of claim 1, wherein the cement accelerator is present in an amount of at least 1 wt % based on the total weight of cement (a).

8. The composition of claim 1, wherein the cement accelerator is present in an amount greater than 0 wt % to 4 wt % based on the total weight of cement (a).

9. The composition of claim 1, further comprising at least one additional chemical component comprising an accelerator, a retarder, a plasticizer, a superplasticizer, a pigment, a corrosion inhibitor, a bonding agent, or a pumping agent, or a combination thereof.

10. The composition claim 2, further comprising a reinforcement component.

11. The composition of claim 1, wherein the composition exhibits a compressive strength of greater than 0 MPa after 3 days of curing.

12. The composition of claim 1, wherein the composition exhibits a compressive strength of at least 5 MPa after 7 days of curing.

13. The composition of claim 1, wherein the composition exhibits a compressive strength of at least 40 MPa after 28 days of curing.

14. The composition claim 1, wherein the composition after mixing with water exhibits a slump value of at least 1 mm as defined by BS EN 206-1.

15. The composition claim 2, wherein the composition is concrete.

16. A cementitious article comprising a hydraulically set product formed from the composition according to claim 1.

17. A method for manufacturing the cement of claim 1, the method comprising:
  a. mixing cement ingredients comprising:
    i. cement;
    ii. an electric arc furnace dust (EAFD); and
    iii. a non-chloride cement accelerator; to thereby form a cement mixture;
  wherein the electric arc furnace dust is present in an amount from greater than 6 wt % to 8 wt % based on the total weight of cement (i).

18. The method of claim 17, further comprising setting the cement mixture.

19. The method of claim 17, further comprising casting the cement mixture to produce cast cement.

20. The method of claim 17, wherein the cement accelerator comprises calcium nitrite, or calcium formate, or a combination thereof.

21. The composition of claim 1, wherein the electric arc furnace dust is present in an amount greater than or equal to 7 wt % based on the total weight of cement (a).

22. The composition of claim 1, wherein the cement accelerator is calcium formate.

* * * * *